United States Patent
Luo

(10) Patent No.: US 10,312,973 B1
(45) Date of Patent: Jun. 4, 2019

(54) ANTENNA COMPONENT, ELECTRONIC DEVICE AND ANTENNA CONTROLLING METHOD

(71) Applicant: GUANGDONG OPPO MOBILE TELECOMMUNICATIONS CORP., LTD., Dongguan, Guangdong (CN)

(72) Inventor: Yizhou Luo, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/223,306

(22) Filed: Dec. 18, 2018

(30) Foreign Application Priority Data

Jan. 19, 2018 (CN) .......................... 2018 1 0055296
Jan. 19, 2018 (CN) .......................... 2018 1 0055704
Jan. 19, 2018 (CN) ..................... 2018 2 0099008 U

(51) Int. Cl.
| | |
|---|---|
| *H04M 1/00* | (2006.01) |
| *H04B 7/0404* | (2017.01) |
| *H04W 52/42* | (2009.01) |
| *H01Q 1/24* | (2006.01) |
| *H04B 1/00* | (2006.01) |

(52) U.S. Cl.
CPC ........... *H04B 7/0404* (2013.01); *H01Q 1/243* (2013.01); *H04W 52/42* (2013.01); *H04B 1/006* (2013.01)

(58) Field of Classification Search
CPC ...... H04B 7/0404; H04B 1/006; H01Q 1/243; H04W 52/42
USPC ........................................ 455/552.1; 370/338
See application file for complete search history.

(56) References Cited

U.S. PATENT DOCUMENTS

| | | | | |
|---|---|---|---|---|
| 2002/0160737 | A1* | 10/2002 | Crawford ............. | H04B 7/0811 455/272 |
| 2004/0095277 | A1 | 5/2004 | Mohamadi | |
| 2004/0095287 | A1 | 5/2004 | Mohamadi | |

FOREIGN PATENT DOCUMENTS

| | | |
|---|---|---|
| CN | 103401577 A | 11/2013 |
| CN | 104638344 A | 5/2015 |
| CN | 105390801 A | 3/2016 |
| CN | 107124212 A | 9/2017 |
| CN | 107276598 A | 10/2017 |
| CN | 108232473 A | 6/2018 |

(Continued)

OTHER PUBLICATIONS

International search report, PCT/CN2018/125441, dated Mar. 27, 2019 (10 pages).

*Primary Examiner* — Marcos Batista
(74) *Attorney, Agent, or Firm* — Ladas & Parry LLP

(57) ABSTRACT

The present disclosure discloses an antenna component, an electronic device and an antenna controlling method. The antenna component includes: multiple antenna structures, wherein at least one antenna structure acts as a master antenna, and at least one antenna structure acts as a diversity antenna; a control switch connected with the antenna structures; a radio frequency module, coupled to the antenna structures through the control switch; wherein the control switch is arranged to, according to transmit power of the at least one antenna structure acting as the master antenna and receive power of the at least one antenna structure acting as the diversity antenna, switch the at least one antenna structure acting as the master antenna to a diversity antenna, and switch the at least one antenna structure acting as the diversity antenna to a master antenna.

20 Claims, 14 Drawing Sheets

(56) References Cited

FOREIGN PATENT DOCUMENTS

| CN | 108270088 A | 7/2018 |
| CN | 207852942 U | 9/2018 |

\* cited by examiner

ANTENNA COMPONENT, ELECTRONIC DEVICE AND ANTENNA CONTROLLING METHOD

CROSS-REFERENCE TO RELATED APPLICATIONS

The present application claims foreign priority of Chinese Patent Applications No. 201820099008.1, filed on Jan. 19, 2018, No. 201810055296.5, filed on Jan. 19, 2018 and No. 201810055704.7, filed on Jan. 19, 2018 in the State Intellectual Property Office of China, the entire contents of which are hereby incorporated by reference.

TECHNICAL FIELD

The present disclosure generally relates to electronic devices, and in particular to an antenna component, an electronic device and an antenna controlling method.

BACKGROUND

With development of network technologies and improvement of intelligence of electronic devices, a user may realize more and more functions through an electronic device, for example, communication, chatting and playing games.

When a user is communicating or chatting with an electronic device, signal transmission may be achieved through an antenna of the electronic device.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

Figure 1:
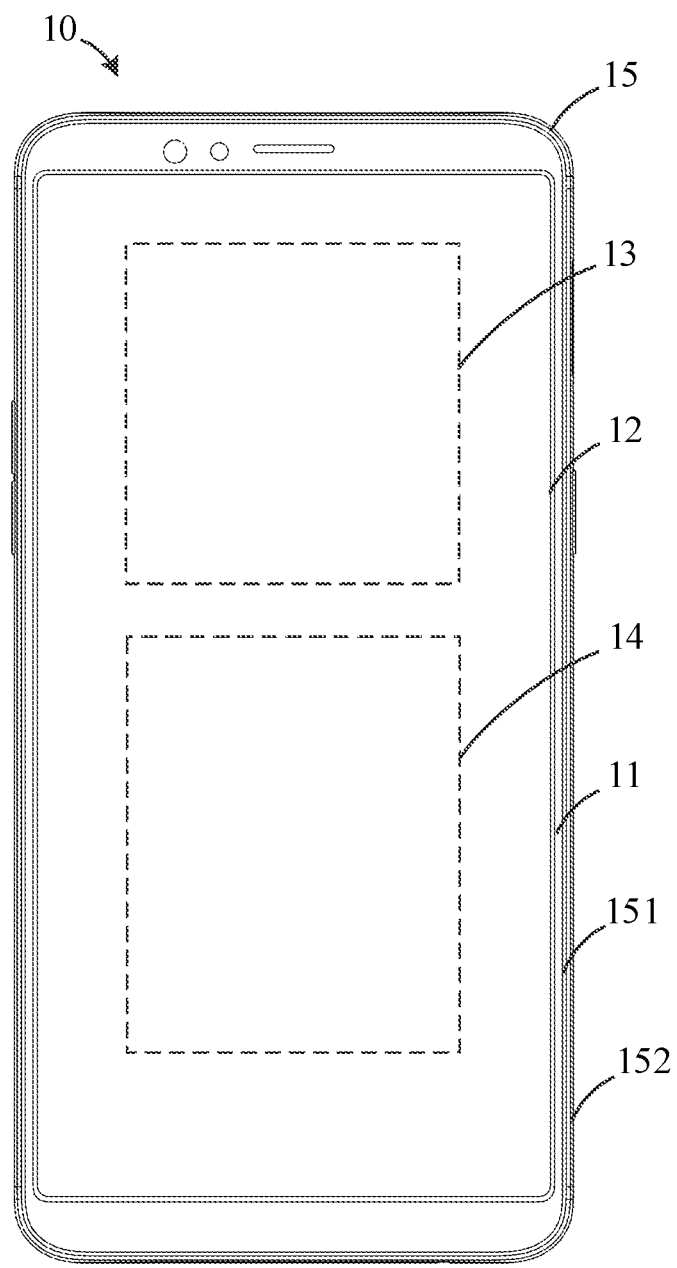
FIG. 1 is a front view of an electronic device according to an embodiment of the present disclosure.

The technical solutions in the embodiments of the disclosure will be clearly and completely described below in combination with the drawings in the embodiments of the disclosure. It is apparent that the described embodiments are not all but only part of embodiments of the disclosure. All other embodiments obtained by those skilled in the art on the basis of the embodiments in the disclosure without creative work shall fall within the scope of protection of the disclosure.

In the descriptions of the disclosure, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and the like are orientation or position relationships shown in the drawings, are adopted not to indicate or imply that indicated devices or components must be in specific orientations or structured and operated in specific orientations but only to conveniently describe the disclosure and simplify descriptions. In addition, terms "first" and "second" are only adopted for description and should not be understood to indicate or imply relative importance or implicitly indicate the number of indicated technical features and thus should not be understood as limits to the disclosure. Therefore, a feature defined by "first" and "second" may explicitly or implicitly indicates inclusion of one or more such features. In the descriptions of the disclosure, "multiple" means two or more than two, unless otherwise limited definitely and specifically.

In the descriptions of the disclosure, it is to be noted that, unless otherwise definitely specified and limited, terms "mount", "mutually connect" and "connect" should be broadly understood. For example, the terms may refer to fixed connection and may also refer to detachable connection or integrated connection. The terms may refer to mechanical connection and may also refer to electrical connection or mutual communication. The terms may refer to direct mutual connection, may also refer to indirect connection through a medium and may refer to communication in two components or an interaction relationship of the two components. For those of ordinary skill in the art, specific meanings of these terms in the disclosure can be understood according to a specific condition.

In the disclosure, unless otherwise definitely specified and limited, the state that a first feature is "above" or "below" a second feature may include that the first and second features directly contact and may also include that the first and second features contact through another feature therebetween rather than directly contact. Moreover, the state that the first feature is "above", "over" and "on" the second feature includes that the first feature is over or above the second feature or only represents that a horizontal height of the first feature is larger than that of the second feature. The state that the first feature is "below", "under" and "beneath" the second feature includes that the first feature is under or below the second feature or only represents that the horizontal height of the first feature is smaller than that of the second feature.

The following disclosure provides many different implementation modes or examples to implement different structures of the disclosure. For simplifying the disclosure of the disclosure, components and arrangements of specific examples will be described below. Of course, they are merely examples and not intended to limit the disclosure. In addition, reference numbers and/or reference letters may be repeated in different examples in the disclosure and such repetitions are made for simplicity and clarity and do not indicate relationships between each discussed implementation mode and/or arrangement. Moreover, examples of various specific processes and examples are provided in the disclosure. However, those of ordinary skill in the art may realize disclosure of other processes and/or use of other materials.

The embodiments of the disclosure provide a display screen component and an electronic device. Detailed descriptions will be made below respectively. The display screen component may be arranged in the electronic device. The electronic device may be a device such as a smart phone or a tablet computer.

Figure 2:
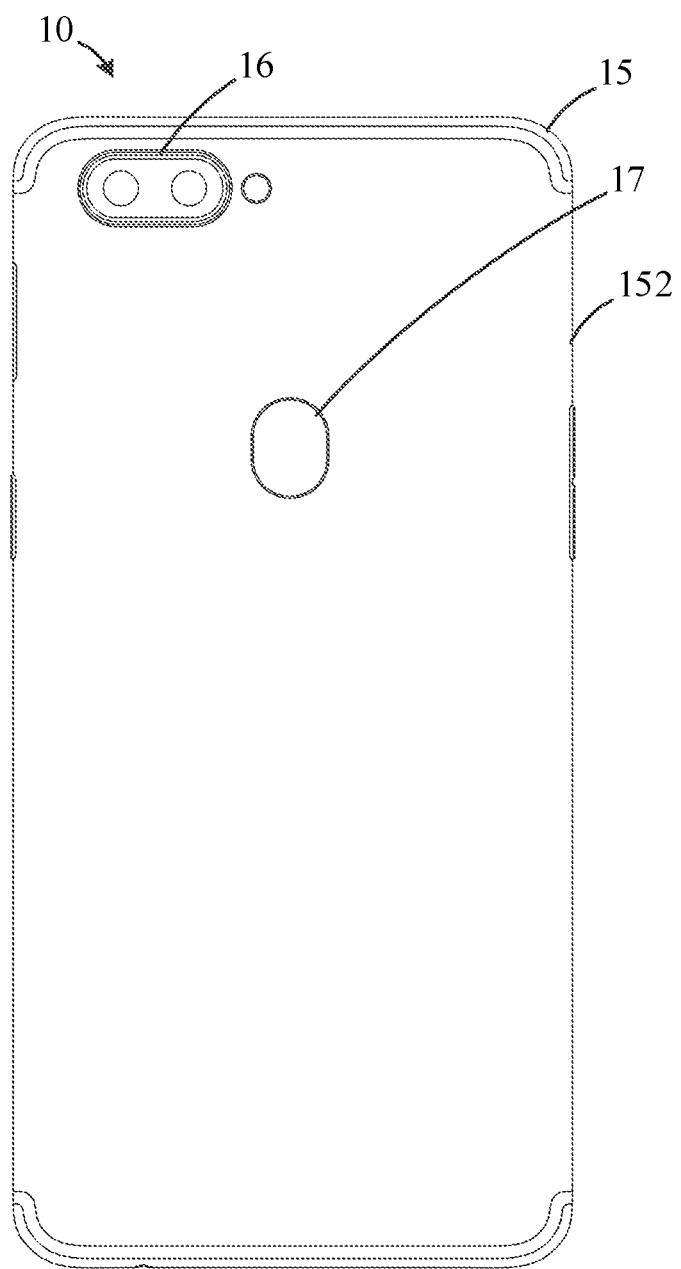
FIG. 2 is a back view of an electronic device according to an embodiment of the present disclosure.

Referring to FIG. 1 and FIG. 2, the electronic device 10 may include a cover plate 11, a display screen 12, a circuit board 13, a battery 14, a shell 15, a camera 16 and a fingerprint unlocking module 17. It is to be noted that the electronic device 10 shown in FIG. 1 and FIG. 2 may further include other devices. In other embodiments, some components such as the camera 16 or the fingerprint unlocking module 17 may not be included in the electronic device 10.

The cover plate 11 is mounted on the display screen 12 to cover the display screen 12. The cover plate 11 may be a transparent glass cover plate for displaying of the display screen. In some embodiments, the cover plate 11 may be a glass cover plate made from sapphire.

The shell 15 may include a middle frame 151 and a back cover 152. The middle frame 151 and the back cover 152 are combined with each other to form the shell 15. The middle frame 151 and the back cover 152 may form an accommodation space to accommodate devices such as the printed circuit board 13, the display screen 12 and the battery 14. Furthermore, the cover plate 11 may be fixed on the shell 15. The cover plate 11 and the shell 15 may cooperatively form a closed space to accommodate devices such as the printed circuit board 13, the display screen 12 and the battery 14. In some embodiments, the cover plate 11 is arranged on the middle frame 151 in a covering manner. The back cover 152 is arranged on the middle frame 151 in the covering manner. The cover plate 11 and the back cover 152 are positioned on opposite surfaces of the middle frame 151. The cover plate 11 and the back cover 152 are opposite to each other.

In some embodiments, the shell 15 may be a shell made from metal material such as magnesium alloy, stainless steel and the like. It is to be noted that the material of the shell 15 of the disclosure is not limited thereto, and other manner may also be adopted. For example, the shell 15 may be a plastic shell or a ceramic shell. Alternatively, the shell 15 may include a plastic part and a metal part. For example, a magnesium alloy substrate is firstly formed in an injection molding manner, and then injection molding plastics is injection-molded on the magnesium alloy substrate to form a plastic substrate, thus forming the whole shell structure.

It is to be noted that the shell structure of the disclosure is not limited thereto. For example, the back cover and the middle frame may be integrally formed to form a complete shell 15 structure. In this circumstance, the shell directly defines an accommodation space arranged to accommodate devices such as the printed circuit board 13, the display screen 12, the battery 14 and the like.

The printed circuit board 13 is mounted in the shell 15. The printed circuit board 13 may be a main board of the electronic device 10. One, two or more of functional components such as a motor, a microphone, a loudspeaker, an earphone interface, a universal serial bus interface, the camera 16, a distance sensor, an ambient light sensor, a receiver, a processor and the like may be integrated on the printed circuit board 13.

In some embodiments, the printed circuit board 13 may be fixed in the shell 15. Specifically, the printed circuit board 13 may be screwed to the middle frame 151 through screws and may also be clamped and assembled on the middle frame 151 in a buckle manner. It is to be noted that the method for fixing the printed circuit board 13 on the middle frame 151 in the present disclosure is not limited thereto, and other manner may also be adopted, for example, by fixing through buckles and bolts.

The battery 14 is mounted in the shell 15. The battery 14 is electrically connected with the printed circuit board 13 to supply power to the electronic device 10. The shell 15 may be used as a battery cover of the battery 14. The shell 15 covers the battery 14 to protect the battery 14. Specifically, the back cover covers the battery 14 to protect the battery 14 to reduce damage to the battery 14 caused by collision, falling and the like of the electronic device 10.

The display screen 12 is mounted in the shell 15. Meanwhile, the display screen 12 is electrically connected to the printed circuit board 13 to form a display surface of the electronic device 10. The display screen 12 may include a display region and a non-display region. The display region may be arranged to display images or is provided for touch control function of a user. An opening for sound and light conduction is formed in a top region of the non-display region. Functional components such as a fingerprint module, a touch button and the like may be arranged at the bottom of the non-display region. The cover plate 11 is mounted on the display screen 12 to cover the display screen 12, can form a display region and non-display region that are the same as those of the display screen 12, and also can form a display region and non-display region that are different from those of the display screen.

Figure 3:
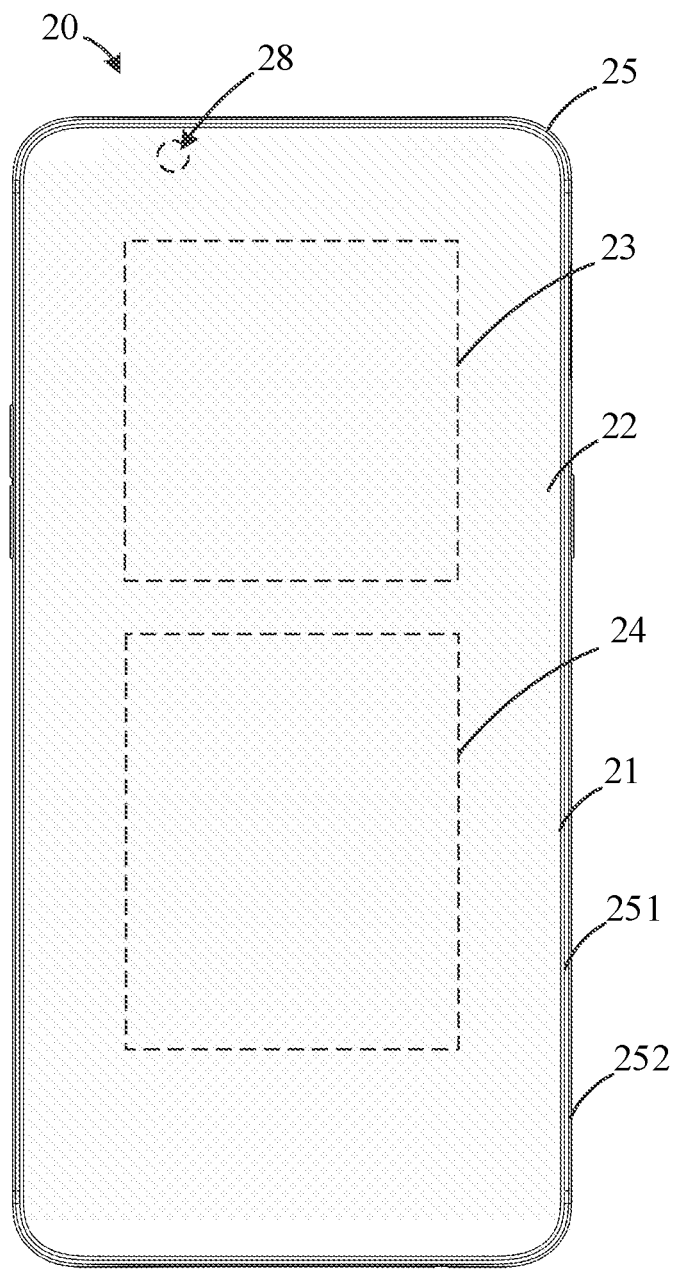
FIG. 3 is a front view of an electronic device according to another embodiment of the present disclosure.

It is to be noted that the structure of the display screen 12 is not limited thereto. For example, the display screen 12 may be an irregularly shaped screen. Specifically, referring to FIG. 3, the electronic device 20 may include a display screen 22, a cover plate 21, a printed circuit board 23, a battery 24 and a shell 25. A light transmission region 28 is directly formed on the display screen 22. Specifically, the display screen 22 is provided with a through hole which penetrates through the display screen 22 in a thickness direction, the light transmission region 28 may include the through hole and a functional component such as a front camera, a receiver, a sensor and the like may be arranged at the position of the through hole. For another example, the display screen 22 is provided with a non-display region and the light transmission region 28 may include the non-display region. The cover plate 21 is suitable for a structural setting of the display screen 22. It is to be noted that the shell 25 may refer to the abovementioned shell 15, the printed circuit board 23 may refer to the abovementioned printed circuit board 13 and the battery 24 may refer to the abovementioned battery 14, which are not redundantly described herein.

Figure 4:
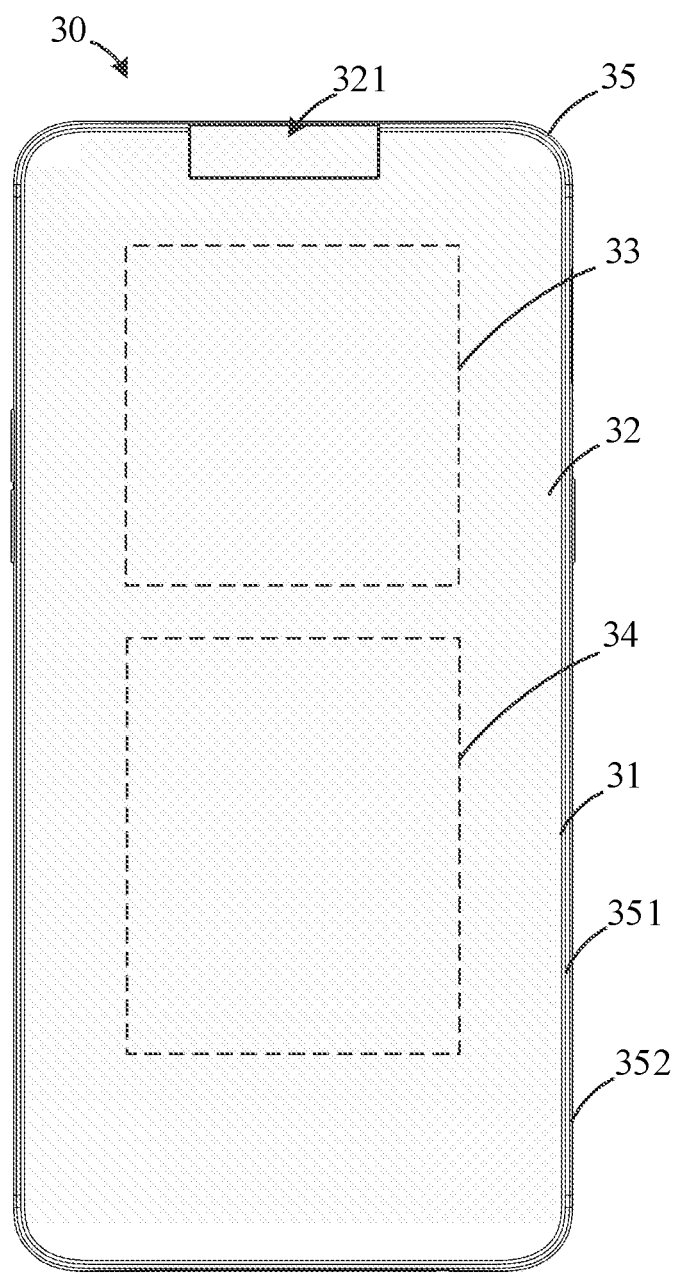
FIG. 4 is a front view of an electronic device according to another embodiment of the disclosure.

Referring to FIG. 4, in some embodiments, the electronic device 30 in FIG. 4 may include a display screen 32, a cover plate 31, a printed circuit board 33, a battery 34 and a shell 35. A notch 321 is formed in a periphery of the display screen 32. A functional component such as a front camera, a receiver, a sensor and the like may be placed in the notch 321. The cover plate 31 is suitable for the display screen 11. The cover plate 31 may be provided with another notch with the same size as the notch 321 at the position of the notch 321, or the cover plate 31 may cover the notch 321. It is to be noted that the shell 35 may refer to the abovementioned shell 15, the printed circuit board 33 may refer to the abovementioned printed circuit board 13 and the battery 34 may refer to the abovementioned battery 14, which are not redundantly described herein.

Figure 5:
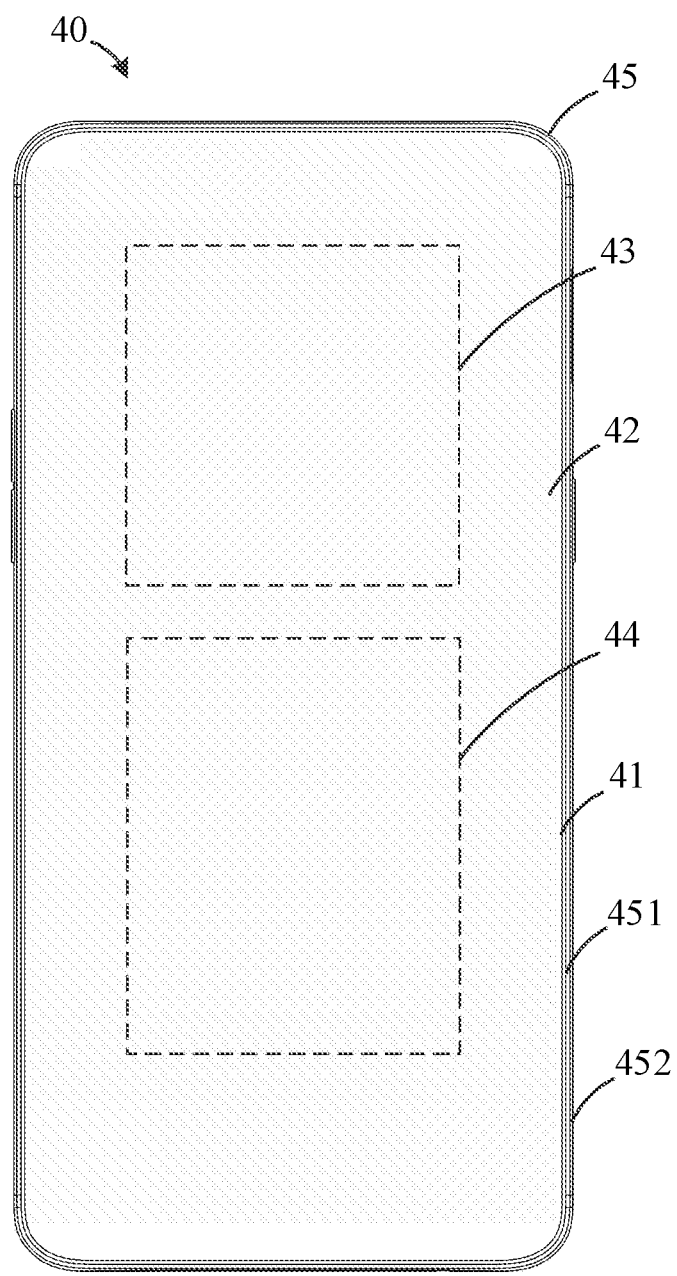
FIG. 5 is a front view of an electronic device according to another embodiment of the disclosure.

It is also to be noted that, in some embodiments, the display screen 12 may not include the non-display region and may have a bezel-less configuration. Functional components such as the distance sensor, the ambient light sensor and the like may be covered by the display screen or at other positions. Specifically, referring to FIG. 5, the electronic device 40 may include a display screen 42, a cover plate 41, a printed circuit board 43, a battery 44 and a shell 45. The display screen 42 covers the shell 45 and is not provided with non-display region. The cover plate 41 is suitable for the display screen 42. It is to be noted that the shell 45 may refer to the abovementioned shell 15, the printed circuit board 43 may refer to the abovementioned printed circuit board 13 and the battery 44 may refer to the abovementioned battery 14, which are not redundantly described herein.

In some embodiments, the display screen 12 may be a Liquid Crystal Display (LCD), an Organic Light-Emitting Diode (OLED) display screen or the like. In some embodiments, when the display screen 12 is an LCD, the electronic device 10 may further include a backlight module (not shown).

In some embodiments, the electronic device 10 may further include an antenna structure arranged to transmit and receive signals. The antenna structure may be mounted on the shell 15, for example, the middle frame 151. The antenna structure together with several corresponding components and devices disposed inside the shell 15 may constitute an antenna component. Detailed descriptions of the antenna component will be made below.

Figure 6:
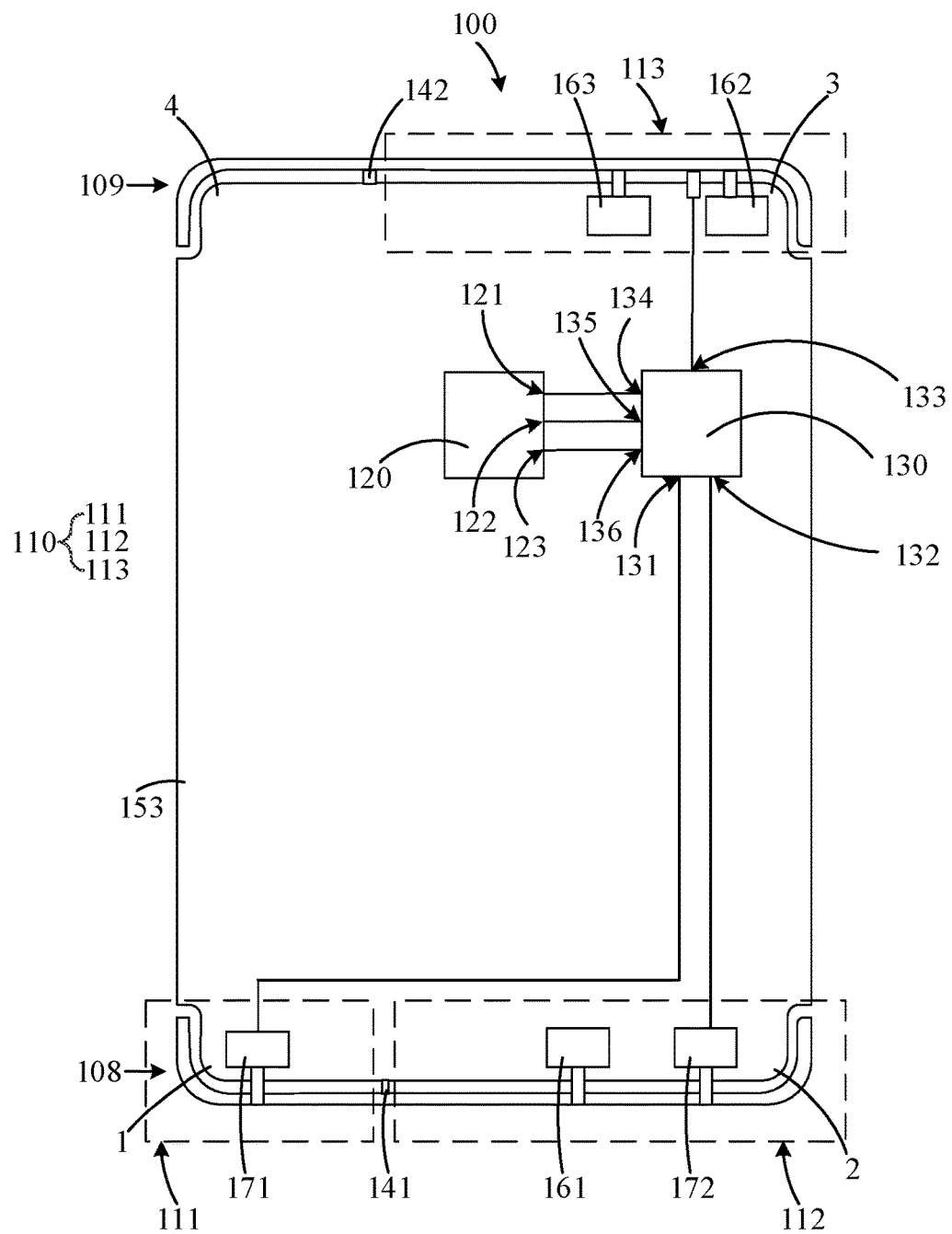
FIG. 6 illustrates the inner structure of an electronic device according to an embodiment of the present disclosure.

Referring to FIG. 6, FIG. 6 shows the inner structure of an electronic device according to an embodiment of the present disclosure. The structure of the electronic device may be similar to those described in any one of above embodiments. Furthermore, the electronic device may include an antenna component 100. The antenna component 100 may include multiple antenna structures 110, a carrier 153, a radio frequency module 120 and a control switch 130.

The carrier 153 may correspond to a shell structure, and it may be a plate-shaped structure and may also be provided with an accommodation cavity. The carrier 153 may be made from metal material, for example, magnesium alloy. The carrier 153 may also be injection-molded from both of metal and plastic. It is to be noted that the carrier 153 may refer to the abovementioned middle frame, the abovementioned back cover, or the abovementioned structure integrally formed by the middle frame and the back cover, which is not redundantly described herein.

In some embodiments, the carrier 153 is provided with a first end portion 108 and a second end portion 109. The first end portion 108 and the second end portion 109 are positioned at two opposite end portions of the carrier 153 respectively. For example, the first end portion 108 is positioned at the bottom of the electronic device 10 and the second end portion 109 is positioned at the top of the electronic device 10.

In some embodiments, the carrier 153 is provided with four corners, i.e., a first corner 1, a second corner 2, a third corner 3 and a fourth corner 4. The first corner 1, the second corner 2, the third corner 3 and the fourth corner 4 are positioned at four corner positions of the carrier 153 respectively. The first corner 1 and the second corner 2 are positioned on two sides of the first end portion 108 respectively. The third corner 3 and the fourth corner 4 are positioned on two sides of the second end portion 109 respectively.

The antenna structure 110 may be mounted on the carrier 153. The antenna structure 110 may transmit and receive signals. In some embodiments, the number of the antenna structures 110 is greater than or equal to three. Descriptions will be made herein with three antenna structures 110 as an example. Specifically, the antenna structures 110 may include a first antenna structure 111, a second antenna structure 112 and a third antenna structure 113.

The first antenna structure 111 may be arranged at a position of the first end portion 108 of the carrier 153 and is positioned on a periphery of the first end portion 108. Specifically, the first antenna structure 111 is positioned at a position of the first corner 1. In some embodiments, the first antenna structure 111 may act as a master antenna. The first antenna structure 111 may transmit and receive signals. For example, the first antenna structure 111 may transmit and receive at least one of low-band (700-960 MHz) signals, middle-band (1,710-2,170 MHz) signals and high-band (2,300-2,690 MHz) signals. It is to be noted that the first antenna structure 111 may also be arranged to transmit and receive other signals. In some embodiments, the first antenna structure 111 may alternatively act as a diversity antenna for receiving signals.

The antenna component 100 may further include a first ground point 141 and a first tuner 171. The first ground point 141 and the first tuner 171 may be mounted on the carrier 153. The first ground point 141 and the first tuner 171 are positioned at the first end portion 108. The first antenna structure 111 is coupled to the first ground point 141 and the first tuner 171. The first antenna structure 111 is coupled to the first ground point 141 so as to be grounded. The first antenna structure 111 is coupled to the first tuner 171. The first tuner 171 may perform frequency reconfiguration on the first antenna structure 111.

The first ground point 141 may be an integrated metal structure with an overall unit reference ground. Alternatively, the first ground point 141 may also be connected to the overall unit reference ground by a metal sheet, in a welding manner or in a bolt screwing locking manner.

The second antenna structure 112 may be arranged at the position of the first end portion 108 of the carrier 153 and on the periphery of the first end portion 108. Specifically, the second antenna structure 112 is positioned at a position of the second corner 2. In some embodiments, the second antenna structure 112 may act as a diversity antenna. The second antenna structure 112 may receive signals. In some embodiments, the second antenna structure 112 may alternatively be the master antenna and arranged to transmit and receive signals. For example, the second antenna structure 112 may transmit and receive at least one signal in the low-band (700-960 MHz), middle-band (1,710-2,170 MHz) and high-band (2,300-2,690 MHz) signals. It is to be noted that the second antenna structure 112 may also be arranged to transmit and receive other signals. In some embodiments, the first antenna structure 111 and the second antenna structure 112 may transmit and receive signals of different bands respectively. For example, the first antenna structure 111 may transmit and receive high-band signals and the second antenna structure 112 may transmit and receive middle-band signals.

The antenna component 100 may further include a first frequency modulation switch 161 and a second tuner 172. The first frequency modulation switch 161 and the second tuner 172 may be mounted on the carrier 153. Specifically, the first frequency modulation switch 161 and the second tuner 172 are positioned at the first end portion 108. The second antenna structure 112 is coupled to the first ground point 141, the second tuner 172 and the first frequency modulation switch 161. The second antenna structure 112 is coupled to the first ground point 141 to be grounded. It is to be noted that the second antenna structure 112 and the first antenna structure 111 may share the first ground point 141. The second antenna structure 112 is coupled to the second tuner 172 and the first frequency modulation switch 161. The second tuner 172 and the first frequency modulation switch 161 may perform frequency reconfiguration on the second antenna structure 112 together.

The third antenna structure 113 may be arranged at a position of the second end portion 109 of the carrier 153 and on a periphery of the second end portion 109. Specifically, the third antenna structure 113 is positioned at a position of the third corner 3. In some embodiments, the third antenna structure 113 may act as a diversity antenna. The third antenna structure 113 may receive signals. In some embodiments, the third antenna structure 113 may alternatively act as a master antenna and be arranged to transmit and receive signals.

The antenna component 100 may further include a second ground point 142, a second frequency modulation switch 162 and a third frequency modulation switch 163. The second ground point 142, the second frequency modulation switch 162 and the third frequency modulation switch 163 may be mounted on the carrier 153. Specifically, the second ground point 142, the second frequency modulation switch 162 and the third frequency modulation switch 163 are positioned at the second end portion 109. The third antenna structure 113 is coupled to the second ground point 142, the second frequency modulation switch 162 and the third frequency modulation switch 163. The third antenna structure 113 is coupled to the second ground point 142 to be grounded. The third antenna structure 113 is coupled to the second frequency modulation switch 162 and the third frequency modulation switch 163. The second frequency modulation switch 162 and the third frequency modulation switch 163 may perform frequency reconfiguration on the third antenna structure 113 together.

The second ground point 142 may be an integrated metal structure with the overall unit reference ground. Alternatively, the second ground point 142 may be connected to the overall unit reference ground by a metal sheet, in the welding manner or in the bolt screwing locking manner.

In some embodiments, when the antenna component 100 works in an initial state, the first antenna structure 111 may be the master antenna and the second antenna structure 112 and the third antenna structure 113 may be diversity antennae. For example, the first antenna structure 111 may transmit and receive at least one signal in the low-band (700-960 MHz), middle-band (1,710-2,170 MHz) and high-band (2,300-2,690 MHz) signals. The second antenna structure 112 and the third antenna structure 113 may receive signals of different bands respectively. For example, the second antenna structure 112 may receive the high-band signal and the third antenna structure 113 may receive the middle-band signal. It is to be noted that the first antenna structure 111 may also be arranged to transmit and receive other signals while the second antenna structure 112 and the third antenna structure 113 may also receive signals of the same bands.

The radio frequency module 120 is coupled to the antenna structures 110, e.g., the first antenna structure 111, the second antenna structure 112 and the third antenna structure 113 through the control switch 130.

In some embodiment, at least one antenna structure 100 may initially act as a master antenna, and at least one antenna structure 100 may initially act as a diversity antenna. For example, the first antenna structure 111 may initially act as a master antenna and the third antenna structure 113 may initially act as a diversity antenna. At the same time, the second antenna structure 112 may initially act either as a master antenna or a diversity antenna.

The control switch 130 is arranged to, according to transmit power of the antenna structure(s) 100 acting as a master antenna and receive power of the antenna structure(s) 100 acting as a diversity antenna, switch the antenna structure(s) 100 acting as a master antenna to a diversity antenna, and switch the antenna structure(s) 100 acting as a diversity antenna to a master antenna.

For example, in some embodiments, the first antenna structure 111 may initially act as a master antenna while the second antenna structure 112 and the third antenna structure 113 each act as a diversity antenna. In this case, when the transmit power of the first antenna structure 111 is lower than a first threshold value, and the receive power of the second antenna structure 112 and/or the third antenna structure 113 is higher than a second threshold value, the control switch 130 may switch one of the second antenna structure 112 and the third antenna structure 113 which has a higher receive power to a master antenna, and switch the first antenna structure 111 to a diversity antenna. The first threshold value is smaller than the second threshold value.

For example, in other embodiments, each of the first antenna structure 111 and the second antenna structure 112 may initially act as a master antenna while the third antenna structure 113 acts as a diversity antenna. In this case, when the transmit power of the first antenna structure 111 and/or the second antenna structure 112 is lower than a first threshold value, and the receive power of the third antenna structure 113 is higher than a second threshold value, the control switch 130 may switch one of the first antenna structure 111 and the second antenna structure 112 which has a lower transmit power to a diversity antenna, and switch the third antenna structure 113 to a master antenna. Similarly, the first threshold value is smaller than the second threshold value.

In some embodiments, an initial position of the antenna structure 110 which acts as the master antenna is variable. For example, in a certain initial state, the antenna structure 110 acting as the master antenna may be the first antenna structure 111 positioned at the position of the first corner 1. In a certain initial state, the antenna structure 110 acting as the master antenna may also be the second antenna structure 112 positioned at the position of the second corner 2. In a certain initial state, the antenna structure 110 acting as the master antenna may also be the third antenna structure 113 positioned at the position of the third corner 3.

In the example given below, the first antenna structure 111 at the first corner 1 may act as a master antenna while the second and third antenna structures (112 and 113) at the second and third corner (2 and 3) may act as diversity antennae in the initial state.

Figure 7:
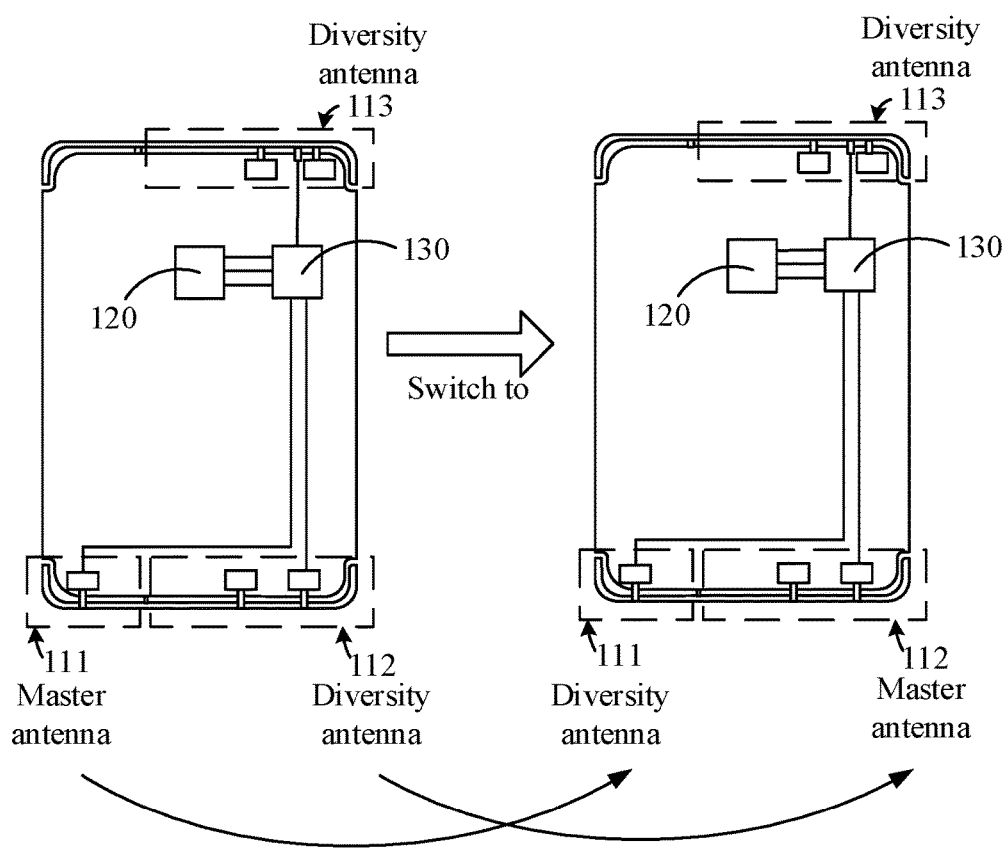
FIG. 7 illustrates a mode-switching scenario of an electronic device according to an embodiment of the present disclosure.

For example, referring to FIG. 7, in this case, the transmit power of the first antenna structure 111 is lower than the first threshold value, and the receive power of the second antenna structure 112 and the third antenna structure 113 is higher than the second threshold value. Besides, the receive power of the second antenna structure 112 is higher than that of the third antenna structure 113. Accordingly, the second antenna structure 112 may be switched from a diversity antenna state to a master antenna state, the first antenna structure 111 may be switched from a master antenna state to a diversity antenna state, and the third antenna structure 113 may be kept in a diversity antenna state.

For example, referring to FIG. 7, in this case, the transmit power of the first antenna structure 111 is lower than the first threshold value, and the receive power of the second antenna structure 112 and the third antenna structure 113 is higher than the second threshold value. Besides, the receive power of the second antenna structure 112 is lower than that of the third antenna structure 113. Accordingly, the third antenna structure 113 may be switched from a diversity antenna state to a master antenna state, the first antenna structure 111 may be switched from a master antenna state to a diversity antenna state, and the second antenna structure 112 may be kept in a diversity antenna state.

Figure 9:
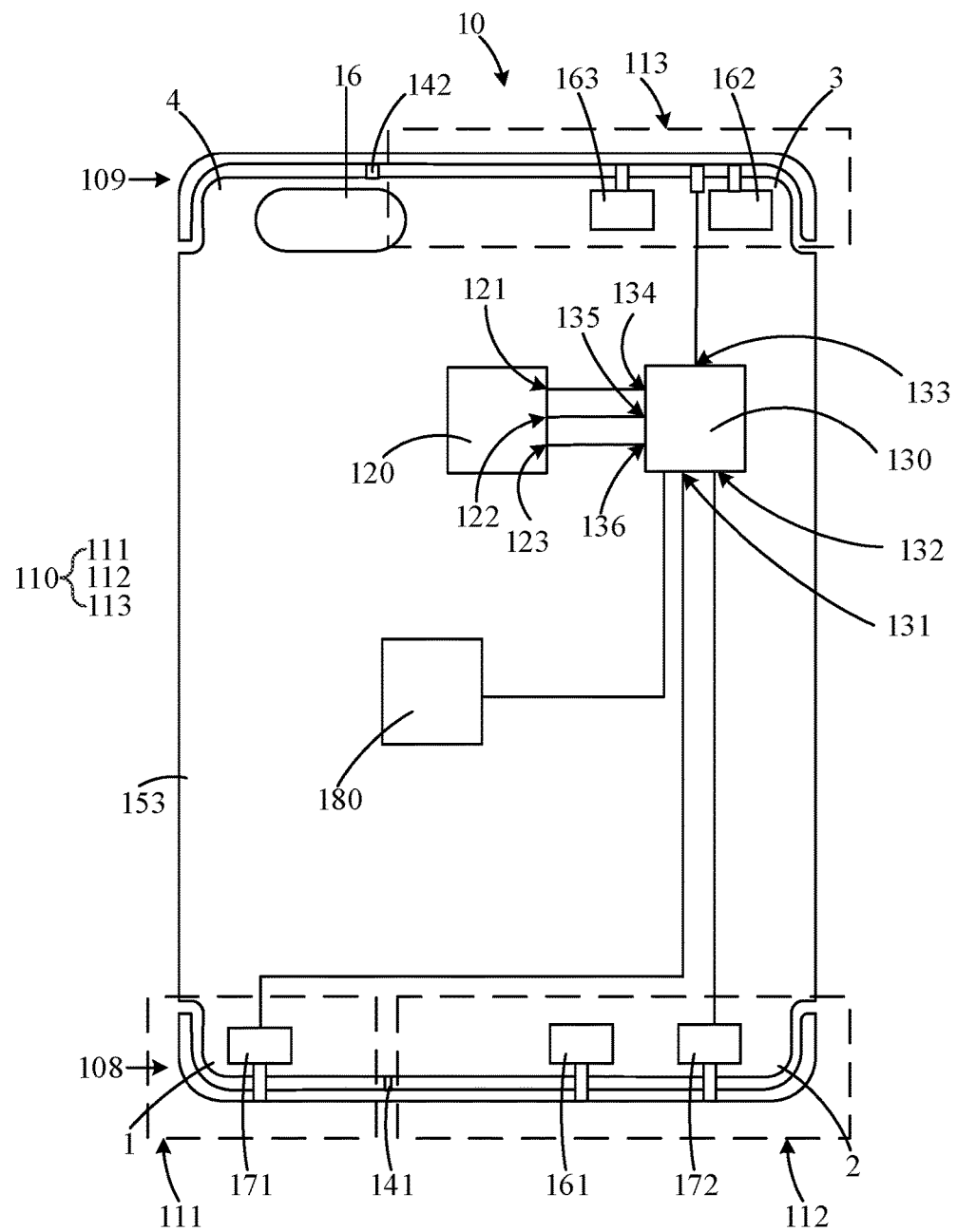
FIG. 9 illustrates the inner structure of an electronic device according to another embodiment of the present disclosure.

It is to be noted that, a camera may be mounted on the carrier 153. Specifically, referring to FIG. 9, the camera 16 of the electronic device 10 may be mounted on the carrier 153. In some embodiments, the camera 16 may be positioned at the position of the second end portion 109. The electronic device 10 further includes a processor 180. The first antenna structure 111, the second antenna structure 112, the third antenna structure 113, the radio frequency module 120 and the control switch 130 on the carrier 153 are coupled to the processor 180.

The radio frequency module 120 may include a first interface 121, a second interface 122 and a third interface 123. The first interface 121 is arranged to transmit and receive signals. The second interface 122 and the third interface 123 are arranged to receive signals. In some embodiments, the first interface 121 is a master antenna interface and the second interface 122 and the third interface 123 are diversity antenna interfaces. In other embodiments, the first interface 121 and the second interface 122 may be master interfaces configured to transmit and receive signals, and the third interface 123 may be a diversity antenna interface configured to receive signals only.

The radio frequency module 120 may be mounted on the carrier 153. Specifically, the radio frequency module 120 may be integrated on the printed circuit board. The radio frequency module 120 may be arranged at the second end portion 109 of the carrier, namely, at the same end as the third antenna.

The control switch 130 may be mounted on the carrier 153. Specifically, the control switch 130 may be integrated on the printed circuit board. In some embodiments, the control switch 130 is provided with a first port 131, a second port 132, a third port 133, a fourth port 134, a fifth port 135 and a sixth port 136. The first port 131 of the control switch 130 is coupled to the first antenna structure 111. The second port 132 of the control switch 130 is coupled to the second antenna structure 112. The third port 133 of the control switch 130 is coupled to the third antenna structure 113. The fourth port 134, fifth port 135 and sixth port 136 of the control switch are coupled to the first interface 121, second interface 122 and third interface 123 of the radio frequency module 120 respectively. The control switch 130 may electrically connect the first antenna structure 111, the second antenna structure 112 and the third antenna structure 113 with the radio frequency module 120.

The first port 131 is coupled to the first antenna structure 111. Specifically, the first port 131 is coupled to the first antenna structure 111 through the first tuner 171, i.e. the first port 131 is coupled to the first tuner 171 and the first tuner 171 is coupled to the first antenna structure 111.

The second port 132 is coupled to the second antenna structure 112. Specifically, the second port 132 is coupled to the second antenna structure 112 through the second tuner 172, i.e. the second port 132 is coupled to the second tuner 172 and the second tuner 172 is coupled to the second antenna structure 112.

The radio frequency module 120 is coupled to the first antenna structure 111, the second antenna structure 112 and the third antenna structure 113 through the control switch 130.

The processor 180 is arranged to acquire the transmit power of the antenna structure(s) 110 which acts as a master antenna and the receive power of the antenna structure(s) 110 which acts as a diversity antenna. The processor 180 may be further utilized to control the control switch 130 to, according to the transmit power of the antenna structure(s) 110 acting as a master antenna and the receive power of the antenna structure(s) 110 acting as a diversity antenna, switch the antenna structure(s) acting as a master antenna to a diversity antenna, and switch the antenna structure(s) acting as a diversity antenna to a master antenna.

For example, in some embodiments, the first antenna structure 111 may initially act as a master antenna while the second antenna structure 112 and the third antenna structure 113 each act as a diversity antenna. In this case, the processor 180 may acquire that the transmit power of the first antenna structure 111 is lower than the first threshold value while the receive power of the second antenna structure 112 and/or the third antenna structure 113 is higher than the second threshold value. Accordingly, the processor 180 controls the controls switch 130 to switch one of the second antenna structure 112 and the third antenna structure 113 which has a higher receive power to a master antenna, and switch the first antenna structure 111 to a diversity antenna. The first threshold value is smaller than the second threshold value.

For example, in other embodiments, each of the first antenna structure 111 and the second antenna structure 112 may initially act as a master antenna while the third antenna structure 113 acts as a diversity antenna. In this case, the processor 180 may acquire that the transmit power of the first antenna structure 111 and/or the second antenna structure is lower than the first threshold value while the receive power of the third antenna structure 113 is higher than the second threshold value. Accordingly, the processor 180 controls the controls switch 130 to switch one of the first antenna structure 111 and the second antenna structure 112 which has a lower transmit power to a diversity antenna, and switch the third antenna structure 113 to a master antenna. The first threshold value is smaller than the second threshold value.

Figure 8:
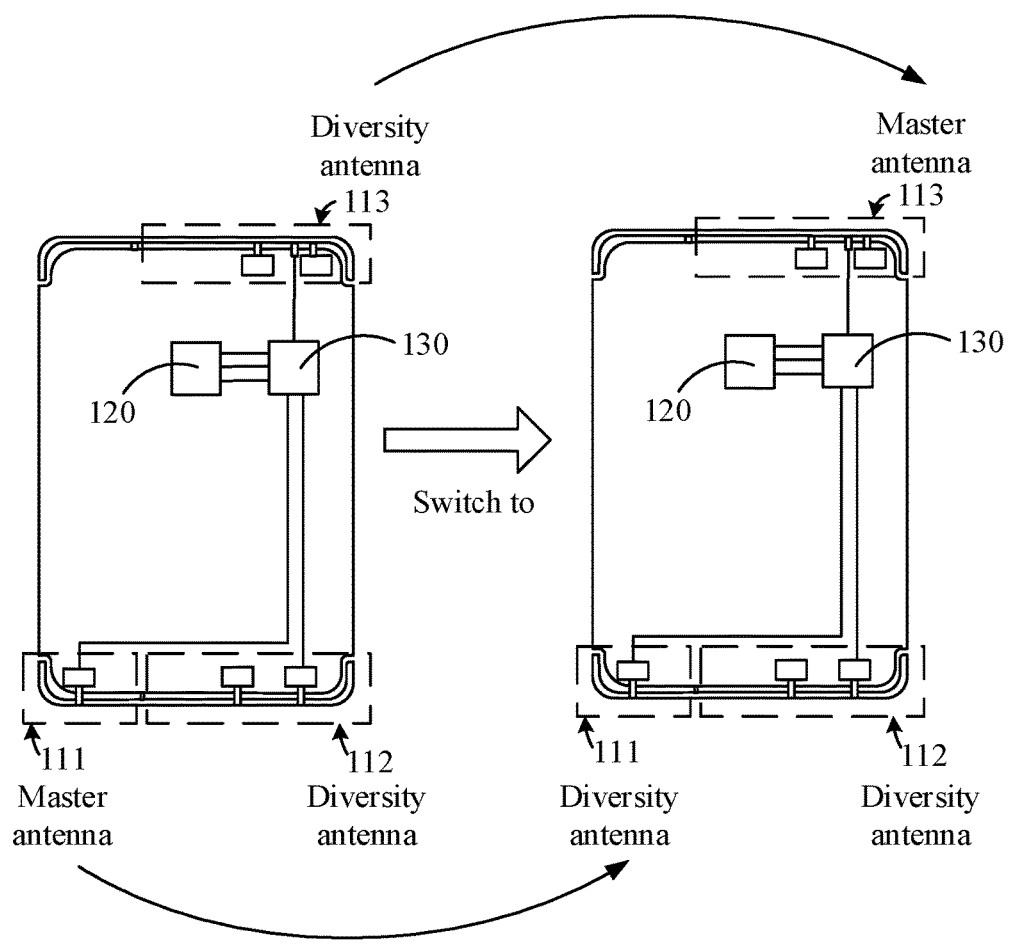
FIG. 8 illustrates a mode-switching scenario of an electronic device according to an embodiment of the present disclosure.

In one embodiment, at the beginning there may be one antenna structure 110 acting as a master antenna and two antenna structures 110 acting as diversity antennae. For example, in a first initial state, the control switch 130 may couple the first antenna structure 111 to the first interface 121 of the radio frequency module 120 by connecting the first port 131 and the fourth port 134, to enable the first antenna structure 111 to transmit and receive signals as the master antenna. The control switch 130 may couple the second antenna structure 112 to the second interface 122 of the radio frequency module 120 by connecting the second port 132 and fifth port 135, to enable the second antenna structure 112 to receive signals as a first diversity antenna. The control switch 130 may couple the third antenna structure 113 to the second interface 122 of the radio frequency module 120 by connecting the third port 133 and sixth port 136, to enable the third antenna structure 113 to receive signals as a second diversity antenna. When the processor 180 acquires that the transmit power of the first antenna structure 111 is lower than the first threshold value and the receive power of the second antenna structure 112 and the third antenna structure 113 is higher than the second threshold value, if the receive power of the second antenna structure 112 is higher than that of the third antenna structure 113, the processor 180 switches the second antenna structure 112 from a first diversity antenna state to the master antenna state, switches the first antenna structure 111 from the master antenna state to the first diversity antenna state, and keeps the third antenna structure 113 in a second diversity antenna state, as shown in FIG. 7. For another example, if the receive power of the second antenna structure 112 is lower than that of the third antenna structure 113, the processor 180 switches the third antenna structure 113 from the second diversity antenna state to the master antenna state, switches the first antenna structure 111 from the master antenna state to the second diversity antenna state, and keeps the second antenna structure 112 in the first diversity antenna state, as shown in FIG. 8.

For example, in a second initial state, the control switch 130 may couple the second antenna structure 112 to the first interface 121 of the radio frequency module 120 by connecting the second port 132 and fourth port 134, to enable the second antenna structure 112 to transmit and receive signals as the master antenna. The control switch 130 may couple the first antenna structure 111 to the second interface 122 of the radio frequency module 120 by connecting the first port 131 and fifth port 135, to enable the first antenna structure 111 to receive signals as the first diversity antenna. The control switch 130 may couple the third antenna structure 113 to the second interface 122 of the radio frequency module 120 by connecting the third port 133 and sixth port 136, to enable the third antenna structure 113 to receive signals as the second diversity antenna. When the processor 180 acquires that transmit power of the second antenna structure 112 is lower than the first threshold value and receive power of the first antenna structure 111 and the third antenna structure 113 is higher than the second threshold value, if the receive power of the first antenna structure 111 is higher than the third antenna structure 113, the processor 180 switches the first antenna structure 111 from the first diversity antenna state to the master antenna state, switches the second antenna structure 112 from the master antenna state to the first diversity antenna state and keeps the third antenna structure 113 in the second diversity antenna state. For another example, if the receive power of the first antenna structure 111 is lower than the third antenna structure 113, the processor 180 switches the third antenna structure 113 from the second diversity antenna state to the master antenna state, switches the second antenna structure 112 from the master antenna state to the second diversity antenna state and keeps the first antenna structure 111 in the first diversity antenna state.

For example, in a third initial state, the control switch 130 may couple the third antenna structure 113 to the first interface 121 of the radio frequency module 120 by connecting the third port 133 and fourth port 134, to enable the third antenna structure 113 to transmit and receive signals as the master antenna. The control switch 130 may couple the first antenna structure 111 to the second interface 122 of the radio frequency module 120 by connecting the first port 131 and fifth port 135, to enable the first antenna structure 111 to receive signals as the first diversity antenna. The control switch 130 may couple the second antenna structure 112 to the second interface 122 of the radio frequency module 120 by connecting the second port 132 and fifth end 136, to enable the second antenna structure 112 to receive signals as the second diversity antenna. When the processor 180 acquires that transmit power of the third antenna structure 113 is lower than the first threshold value and the receive power of the first antenna structure 111 and the second antenna structure 112 is higher than the second threshold value, if the receive power of the first antenna structure 111 is higher than the second antenna structure 112, the processor 180 switches the first antenna structure 111 from the first diversity antenna state to the master antenna state, switches the third antenna structure 113 from the master antenna state to the first diversity antenna state and keeps the second antenna structure 112 in the second diversity antenna state. For another example, if the receive power of the first antenna structure 111 is lower than the third antenna structure 113, the processor 180 switches the second antenna structure 112 from the second diversity antenna state to the master antenna state, switches the third antenna structure 113 from the master antenna state to the second diversity antenna state and keeps the first antenna structure 111 in the first diversity antenna state.

In another embodiment, at the beginning there may be one antenna structure 110 acting as a master antenna and two antenna structures 110 acting as diversity antennae. For example, in a first initial state, the control switch 130 may couple the first antenna structure 111 to the first interface 121 of the radio frequency module 120 by connecting the first port 131 and the fourth port 134 to enable the first antenna structure 111 to transmit and receive signals as a first master antenna. The control switch 130 may couple the second antenna structure 112 to the second interface 122 of the radio frequency module 120 by connecting the second port 132 and fifth port 135 to enable the second antenna structure 112 to transmit and receive signals as a second master antenna. Signal bands of the first master antenna and the second master antenna may either be same or different, which is not limited in the present disclosure. The control switch 130 may couple the third antenna structure 113 to the third interface 123 of the radio frequency module 120 by connecting the third port 133 and sixth port 136 to enable the third antenna structure 113 to receive signals as the diversity antenna. When the processor 180 acquires that the transmit power of the first antenna structure 111 and/or the second antenna structure 112 is lower than the first threshold value and the receive power of the third antenna structure 113 is higher than the second threshold value, one of the first antenna structure 111 and the second antenna structure 112 which has a lower transmit power may be switched to a diversity antenna while the third antenna structure 113 may be switched to a master antenna. The first threshold value is smaller than the second threshold value.

It should be understood that the structure of the control switch 130 described above is merely for illustrative purpose. The number of ports (131~136) of the control switch 130 may be determined based on actual design requirement. As described above, according to some embodiments of the present disclosure, three antenna structures are adopted. The control switch 130 controls the master antenna structure(s) of the three antenna structures to transmit and receive signals, and controls the diversity antenna structures(s) of the three antenna structures to receive signals, so that different signal bands may be covered and signal strength may be enhanced. When it is detected that the antenna structure presently used as the master antenna is covered or is relatively poor in term of signal quality, another antenna structure which is uncovered or has the best signal quality may be switched to the master antenna, so as to improve antenna performance of the antenna component 100 and improve signal transmission efficiency.

For example, the electronic device 10 may be a mobile phone. When the mobile phone works in a single-head mode, the third antenna structure 113 originally determined as the master antenna is likely to be covered. In this circumstance, the processor 180 controls the control switch 130 to determine the first antenna structure 111 as the master antenna to transmit and receive signals, and to determine the second antenna structure 112 and the third antenna structure 113 as the first diversity antenna and the second diversity antenna respectively to receive signals Alternatively, the processor 180 may control the control switch 130 to determine the second antenna structure 112 to transmit and receive signals as the master antenna, and to determine the first antenna structure 111 and the third antenna structure 113 to receive signals as the first diversity antenna and the second diversity antenna respectively.

For example, when the mobile phone works in a hand mode, the processor 180 controls the control switch 130 to select the third antenna structure 113 which is not held by a hand to transmit and receive signals as the master antenna, and to select the first antenna structure 111 and the second antenna structure 112 as the first diversity antenna and the second diversity antenna respectively to receive signals. If the second antenna structure 112 receiving a presently used band is held by a left hand, the presently used band is switched to be received by the first antenna structure 111. If the first antenna structure 111 receiving the presently used band is held by a right hand, the presently used band is switched to be received by the second antenna structure 112.

For example, when the mobile phone works in a left landscape mode, the processor 180 controls the control switch 130 to select the first antenna structure 111 which is not held by the hand as the master antenna to transmit and receive signals, and to select the second antenna structure 112 and the third antenna structure 113 as the first diversity antenna and the second diversity antenna respectively to receive signals.

For example, when the mobile phone works in a right landscape mode, the processor 180 controls the control switch 130 to select the second antenna structure 112 which is not held by the hand as the master antenna to transmit and receive signals, and to select the first antenna structure 111 and the third antenna structure 113 as the first diversity antenna and the second diversity antenna respectively to receive signals.

It is to be noted that the number of the antenna structures is not limited to three. For example, there may be four, five or more antenna structures.

Figure 10:
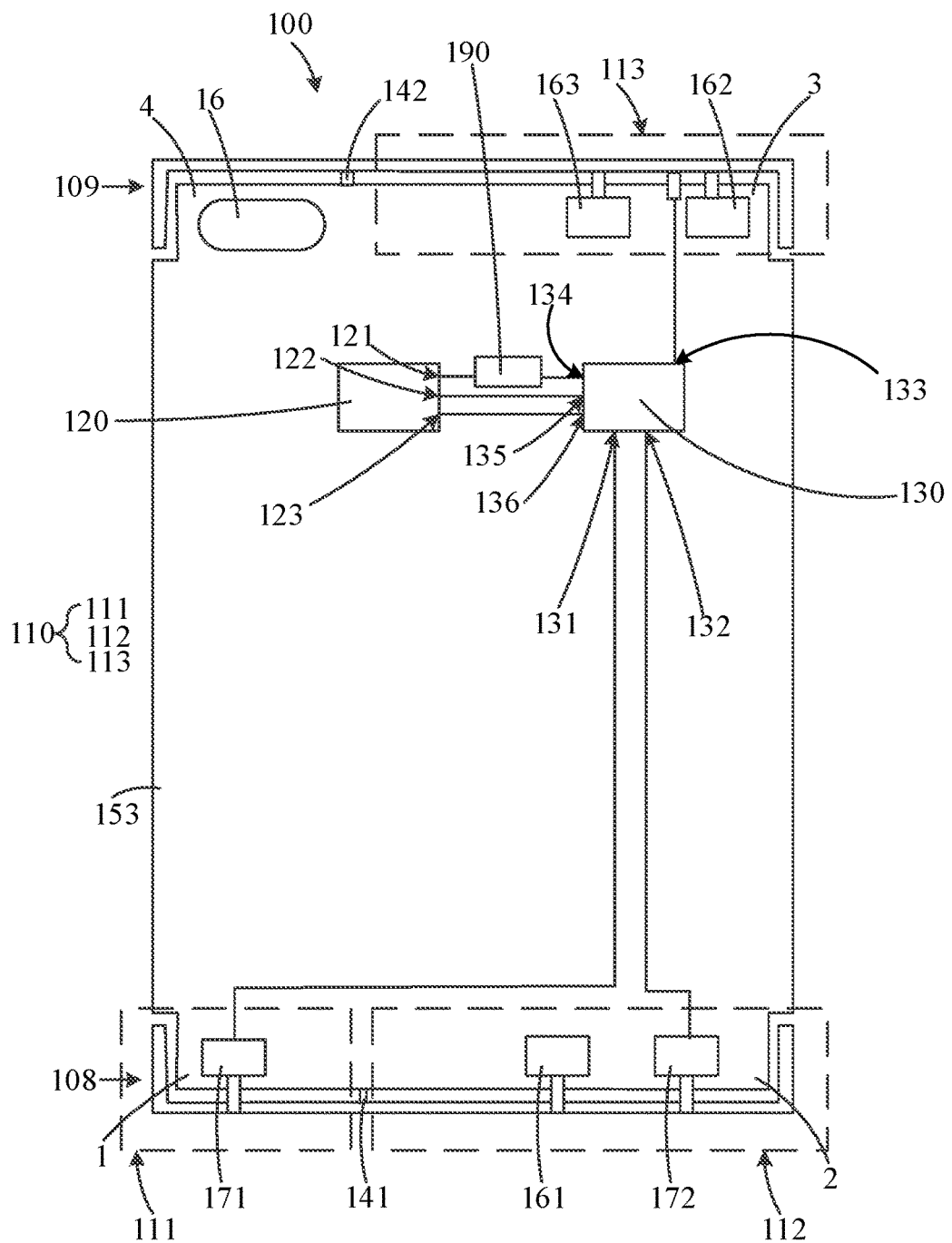
FIG. 10 illustrates the inner structure of an electronic device according to another embodiment of the present disclosure.

Referring to FIG. 10, the antenna component 100 shown in FIG. 10 may further include a power coupler 190. The power coupler 190 may be mounted on the carrier 153. Specifically, one end of the power coupler 190 is connected with the radio frequency module 120 and the other end is connected with the fourth port 134 of the control switch 130.

The power coupler 190 may be utilized to detect impedance matching performance of the first antenna structure 111, the second antenna structure 112 and the third antenna structure 113 respectively, then to compare impedance changes of different antenna structures. The power coupler 190 may be utilized to judge which antenna structure is covered, for example, held by a hand of a user. Based on the result of the power coupler 190, the uncovered antenna structure 110 may be utilized as the antenna of the electronic device. Cyclic detection may also be performed to improve reliability. The antenna structure 110 with relatively high antenna performance may be taken as the antenna of the electronic device.

Then, Received Signal Code Power (RSCP) of the antenna structure with a relatively low impedance matching performance among the first antenna structure 111, the second antenna structure 112 and the third antenna structure 113 may be acquired. The one with relatively low RSCP is selected as a diversity antenna, while the other two antenna structures may be selected as master antennae. Radio frequency bands of the two master antennae may be different. For example, in the case that the first antenna structure 111, the second antenna structure 112 and the third antenna structure 113 are utilized, if the bottom, i.e., the first end portion 108, of the electronic device is held by the user's hand, one of the first antenna structure 111 and the second antenna structure 112 which has a poorer signal quality may be utilized as a diversity antenna while the other of the first antenna structure 111 and the second antenna structure 112 having a better signal quality and the third antenna structure 113 may be taken as a master antenna.

Figure 11:
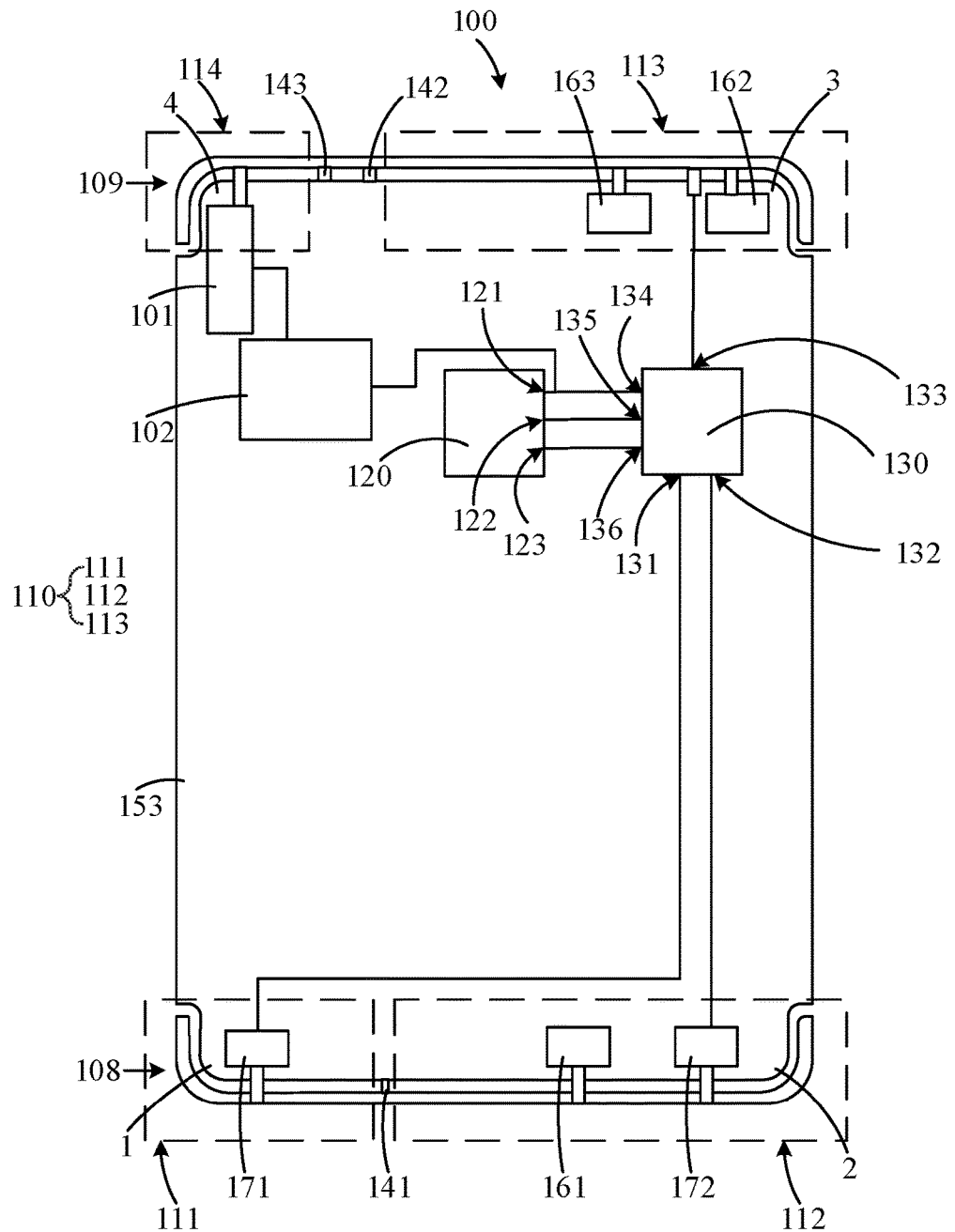
FIG. 11 illustrates the inner structure of an electronic device according to another embodiment of the present disclosure.

Referring to FIG. 11, the antenna component 100 shown in FIG. 11 may further include a fourth antenna structure 114. The fourth antenna structure 114 may be mounted on the carrier 153. Specifically, the fourth antenna structure 114 is arranged at the position of the second end portion 109 and the fourth antenna structure 114 is positioned at a position of the fourth corner 4.

In some embodiments, the fourth antenna structure 114 may receive GPS signals and/or short-range communication signals e.g., GPS, Wireless Fidelity (WiFi) 2.4th-Generation (2.4G)/5th-Generation (5G) signals or Bluetooth signals.

In some embodiments, the fourth antenna structure 114 is coupled to the radio frequency module 120.

The antenna component 100 may further include a third ground point 143, a matching circuit 101 and a wireless module 102. The third ground point 143, the matching circuit 101 and the wireless module 102 may be mounted on the carrier 153. The fourth antenna structure 114 is coupled to the third ground point 143 to be grounded. The fourth antenna structure 114 is coupled to the matching circuit 101 and the wireless module 102. Specifically, the fourth antenna structure 114 is coupled to the matching circuit 101, the matching circuit 101 is coupled to the wireless module 102 and the wireless module 102 is coupled to the radio frequency module 120.

The third ground point 143 is positioned at the position of the second end portion 109. The third ground point 143 and the second ground point 142 are arranged adjacently and spaced apart from one another. In some embodiments, the third antenna structure 113, the second ground point 142, the third ground point 143 and the fourth antenna structure 114 are sequentially arranged at the position of the second end portion 109. In a practical production process, a spacing between the second ground point 142 and the third ground point 143 may be controlled according to practical requirement, and an isolation degree between the third antenna structure 113 and the fourth antenna structure 114 may be increased.

In some embodiments, the third ground point 143 may be connected to a reference ground in the carrier 153 and, for example, to the overall unit reference ground of the electronic device 10. Specifically, the third ground point 143 may form an integrated metal structure with the overall unit reference ground. Alternatively, the third ground point 143 may be connected to the overall unit reference ground by a metal sheet, in the welding manner or in the bolt screwing locking manner.

During short-range communication, the wireless module 102 transmits and receives signals through the fourth antenna structure 114. In some embodiments, during short-range communication, for example, WiFi communication, when the radio frequency module 120 uses no communication antenna, that is, the radio frequency module 120 does not use the first antenna structure 111, the second antenna structure 112 or the third antenna structure 113 as the master or diversity antenna, the wireless module 102 may use one of the first antenna structure 111, the second antenna structure 112 and the third antenna structure 113 as an opportunity diversity antenna of the wireless module 102 to form a double receiving antenna system with the fourth antenna structure 114, which may improve antenna performance. Specifically, the wireless module 102 includes two antenna channels. The master antenna channel is directly connected with the fourth antenna structure 114 and the auxiliary antenna channel is connected with the first antenna structure 111, the second antenna structure 112 or the third antenna structure 113 through the control switch 130. The auxiliary antenna channel is mainly arranged for diversity signal reception. It is to be noted that the antenna component 100 may further be provided with a fifth antenna structure. The fifth antenna structure is connected with the auxiliary antenna channel of the wireless module 102.

Figure 12:
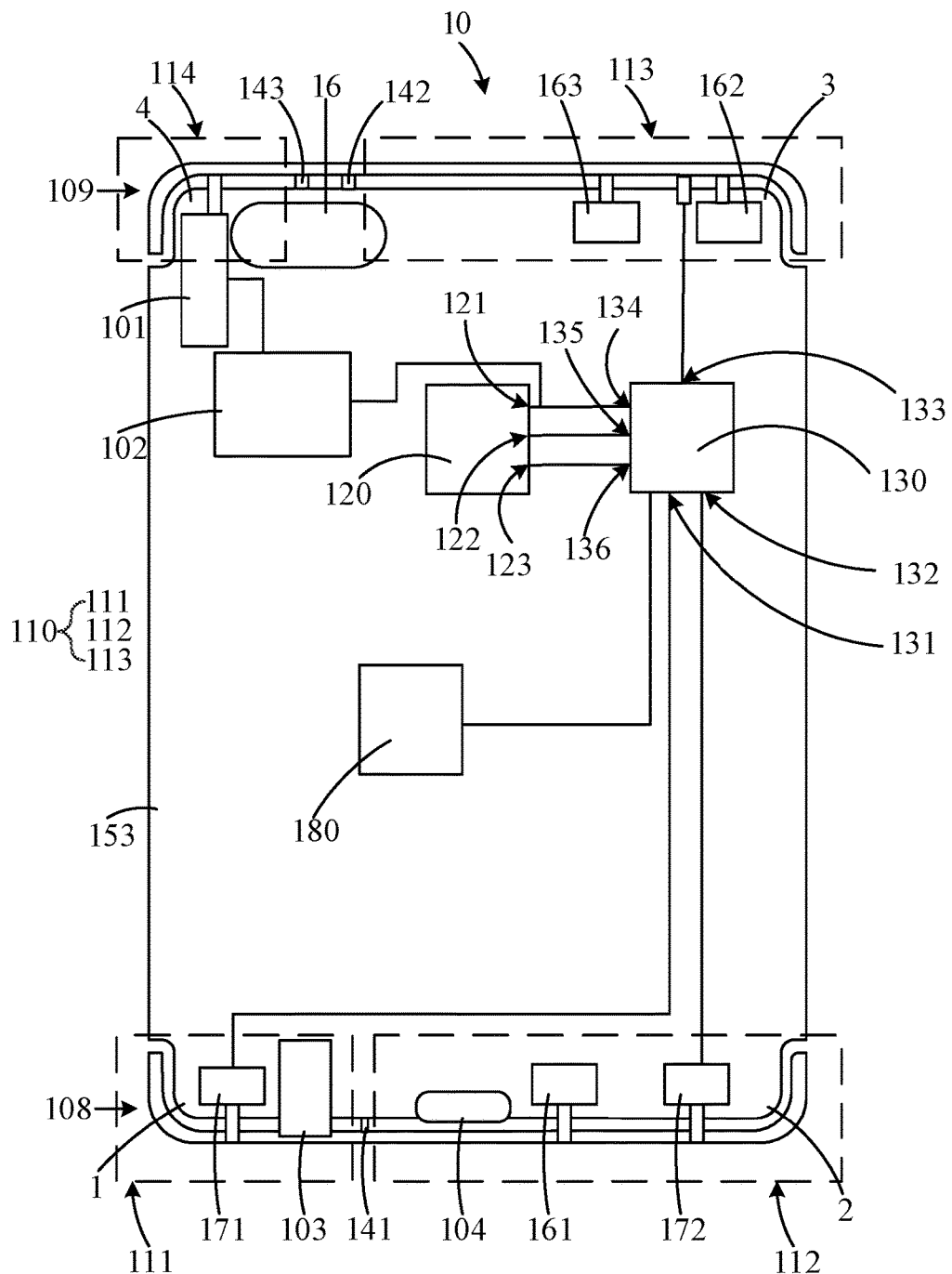
FIG. 12 illustrates the inner structure of an electronic device according to another embodiment of the present disclosure.

Referring to FIG. 12, the electronic device 10 may further include an earphone interface 103 and a communication interface 104.

Figure 13:
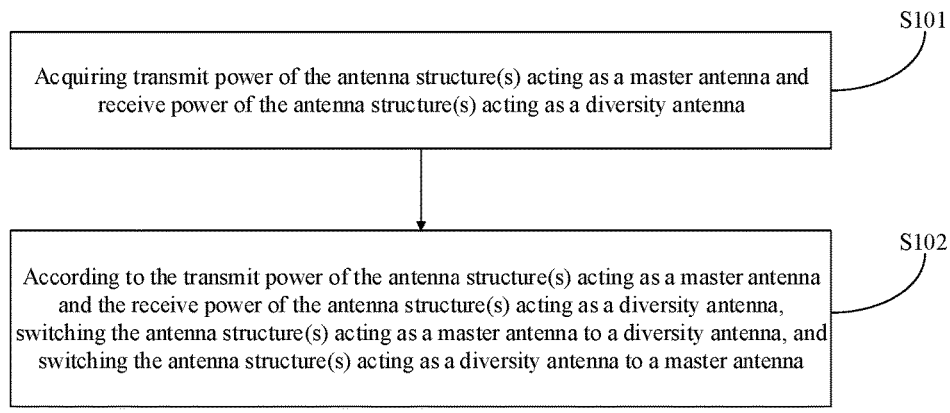
FIG. 13 is a flow chart of an antenna controlling method according to an embodiment of the present disclosure.

Referring to FIG. 13, FIG. 13 is a flowchart of an antenna controlling method according to an embodiment of the present disclosure. The antenna controlling method is applied to an electronic device. The electronic device may be the electronic device 10 mentioned in the abovementioned embodiment, and include an antenna component 100 and a processor 180. The antenna component 100 may include multiple antenna structures. At least one of the multiple antenna structures may initially act as a master antenna, and at least one of the multiple antenna structures may initially act as a diversity antenna. The method may include operations described in the following blocks.

S101: Acquiring the transmit power of the antenna structure(s) acting as a master antenna and the receive power of the antenna(s) acting as a diversity antenna.

S102: According to the transmit power of the antenna structure(s) acting as a master antenna and the receive power of the antenna structure(s) acting as a diversity antenna, switching the antenna structure(s) acting as a master antenna to a diversity antenna, and switching the antenna structure(s) acting as a diversity antenna to a master antenna.

In some embodiments, the first antenna structure 111 may initially act as a master antenna while the second antenna structure 112 and the third antenna structure 113 may initially act as diversity antennae. In this circumstance, when the transmit power of the first antenna structure 111 is lower than a first threshold value and the receive power of the second antenna structure 112 and receive power of the third antenna structure 113 are higher than a second threshold value, one of the second antenna structure 112 and the third antenna structure 113 which has a higher receive power may be switched to the master antenna, and the first antenna structure 111 may be switched to the diversity antenna. The first threshold value is smaller than the second threshold value.

In other embodiments, the first antenna structure 111 and the second antenna structure 112 may initially act as master antennae while the third antenna structure 113 may initially act as a diversity antenna. In this circumstance, when the transmit power of the first antenna structure 111 and the transmit power of the second antenna structure 112 are lower than a first threshold value and the receive power of the third antenna structure 113 is higher than a second threshold value, one of the first antenna structure 1111 and the second antenna structure 113 which has a lower receive power may be switched to the diversity antenna, and the third antenna structure 113 may be switched to the master antenna. The first threshold value is smaller than the second threshold value.

In some embodiments, the antenna controlling method may include operations described in the following blocks for initially determining the master antenna and the diversity antenna.

(1) Acquiring signal quality of the first antenna structure, the second antenna structure and the third antenna structure.

The signal quality of the first antenna structure 111, the second antenna structure 112 and the third antenna structure 113 is detected and acquired through a detection device in the electronic device 10. For example, a parameter such as Signal to Interference plus Noise Ratio (SINR), Reference Signal Receiving Power (RSRP) and Received Signal Strength Indication (RSSI) is detected to judge the signal quality of the antenna structure. Or, data receiving stability is detected when the first antenna structure 111, the second antenna structure 112 or the third antenna structure 113 is the master antenna to judge the signal quality of the antenna structure. The signal quality of the antenna structures may also be judged through a power coupler connected between the radio frequency module 120 and the control switch 130. Specifically, the power coupler detects impedance matching performance of the first antenna structure 111, the second antenna structure 112 or the third antenna structure 113 respectively, then compares impedance changes of different antenna structures to judge which antenna structure 110 is covered, for example, held by a hand of a user. Then the antenna structure 110 which is not covered may be taken as the antenna of the electronic device. Cyclic detection may also be performed to improve reliability;

(2) Selecting the antenna structure with maximum signal quality as the master antenna, and selecting the other at least two antenna structures with relatively poor signal quality as the diversity antennae.

For example, the electronic device 10 is a mobile phone. When the mobile phone works in a single-head mode, the first antenna structure 111 with maximum signal quality is selected to transmit and receive signals as the master antenna, and the second antenna structure 112 and third antenna structure 113 with relatively poor signal quality are selected as a first diversity antenna and a second diversity antenna respectively to receive signals. Or the second antenna structure 112 with maximum signal quality is selected as the master antenna to transmit and receive signals, and the first antenna structure 111 and third antenna structure 113 with relatively poor signal quality are selected as the first diversity antenna and the second diversity antenna respectively to receive signals.

For example, when the mobile phone works in a hand mode, the third antenna structure 113 with maximum signal quality is selected as the master antenna to transmit and receive signals, and the first antenna structure 111 and second antenna structure 112 with relatively poor signal quality are selected as the first diversity antenna and the second diversity antenna respectively to receive signals. If the antenna structure 112 receiving a presently used band is held by a left hand, the presently used band is switched to be received by the antenna structure 111. If the antenna structure 111 receiving the presently used band is held by a right hand, the presently used band is switched to be received by the antenna structure 112.

For example, when the mobile phone works in a left landscape mode, the first antenna structure 111 with maximum signal quality is selected as the master antenna to transmit and receive signals, and the second antenna structure 112 and third antenna structure 113 with relatively poor signal quality are selected as the first diversity antenna and the second diversity antenna respectively to receive signals.

For example, when the mobile phone works in a right landscape mode, the second antenna structure 112 with maximum signal quality is selected as the master antenna to transmit and receive signals, and the first antenna structure 111 and third antenna structure 113 with relatively poor signal quality are selected as the first diversity antenna and the second diversity antenna respectively to receive signals.

Figure 14:
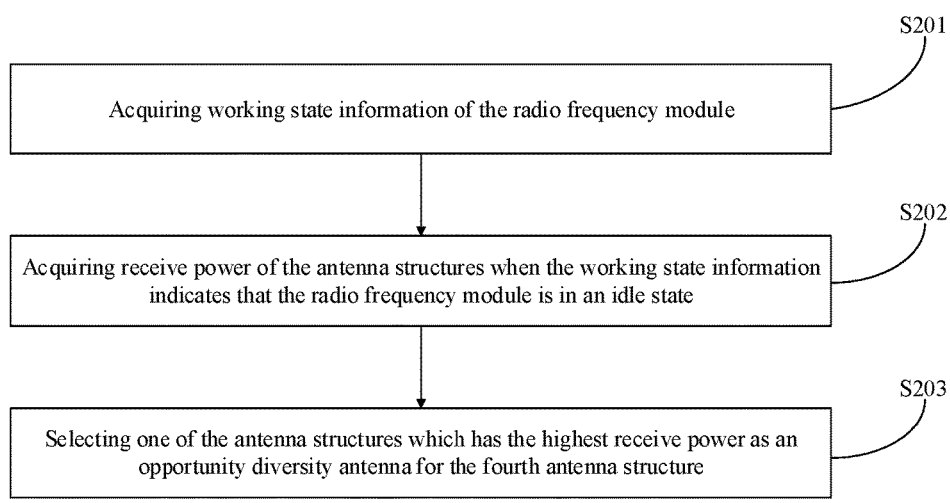
FIG. 14 is a flow chart of an antenna controlling method according to another embodiment of the present disclosure.

Referring to FIG. 14, FIG. 14 is another flowchart of an antenna controlling method according to an embodiment of the present disclosure. The antenna controlling method is applied to an electronic device. The electronic device may be the electronic device 10 mentioned in the abovementioned embodiment and includes an antenna component 100 and a processor 180. The antenna component 180 includes a first antenna structure 111, a second antenna structure 112, a third antenna structure 113, a fourth antenna structure 114, a radio frequency module 120 and a control switch 130. The method may include operations described in the following blocks.

S201: Acquiring working state information of the radio frequency module.

The working state information of the radio frequency module 120 is acquired at first. The radio frequency module 120 may be in one of the following working states: 2nd-Generation (2G) communication, 3rd-Generation (3G) communication, 4th-Generation (4G) communication and idle states;

S202: Acquiring receive power of the antenna structures when the working state information indicates that the radio frequency module is in an idle state.

It can be understood that, if the working state information of the radio frequency module 120 is the idle state, signal quality of the first antenna structure 111, the second antenna structure 112 and the third antenna structure 113 is acquired.

S203: Selecting one of the antenna structures which has the highest receive power as an opportunity diversity antenna for the fourth antenna structure.

It can be understood that the antenna structure with maximum signal quality is selected as the opportunity diversity antenna matched with the fourth antenna structure 114.

During short-range communication, the wireless module 102 transmits and receives signals through the fourth antenna structure 114. During short-range communication, when the radio frequency module 120 uses no communication antenna, that is, the radio frequency module 120 does not use the first antenna structure 111, the second antenna structure 112 or the third antenna structure 113 as the master antenna or the diversity antenna, the wireless module 102 uses one of the first antenna structure 111, the second antenna structure 112 and the third antenna structure 113 as an opportunity diversity antenna of the wireless module to form a double receiving antenna system with the fourth antenna structure 114, which may improve antenna performance. Specifically, the wireless module includes two antenna channels. The master antenna channel is directly connected with the fourth antenna structure 114 and the auxiliary antenna channel is connected with the antenna structure with maximum receive power in the first antenna structure 11, the second antenna structure 112 and the third antenna structure 113 through the control switch 130. The auxiliary antenna channel is mainly arranged for diversity signal reception. For example, under the condition that the electronic device 10 is used in a portrait state (hand mode), a combination of the fourth antenna structure 114 and the third antenna structure 113 is selected. When the electronic device 10 is held by the hand in a left landscape state, a combination of the fourth antenna structure 114 and the first antenna structure 111 is selected. When the electronic device 10 is held by the hand in a right landscape state, a combination of the fourth antenna structure 114 and the second antenna structure 112 is selected.

Figure 15:
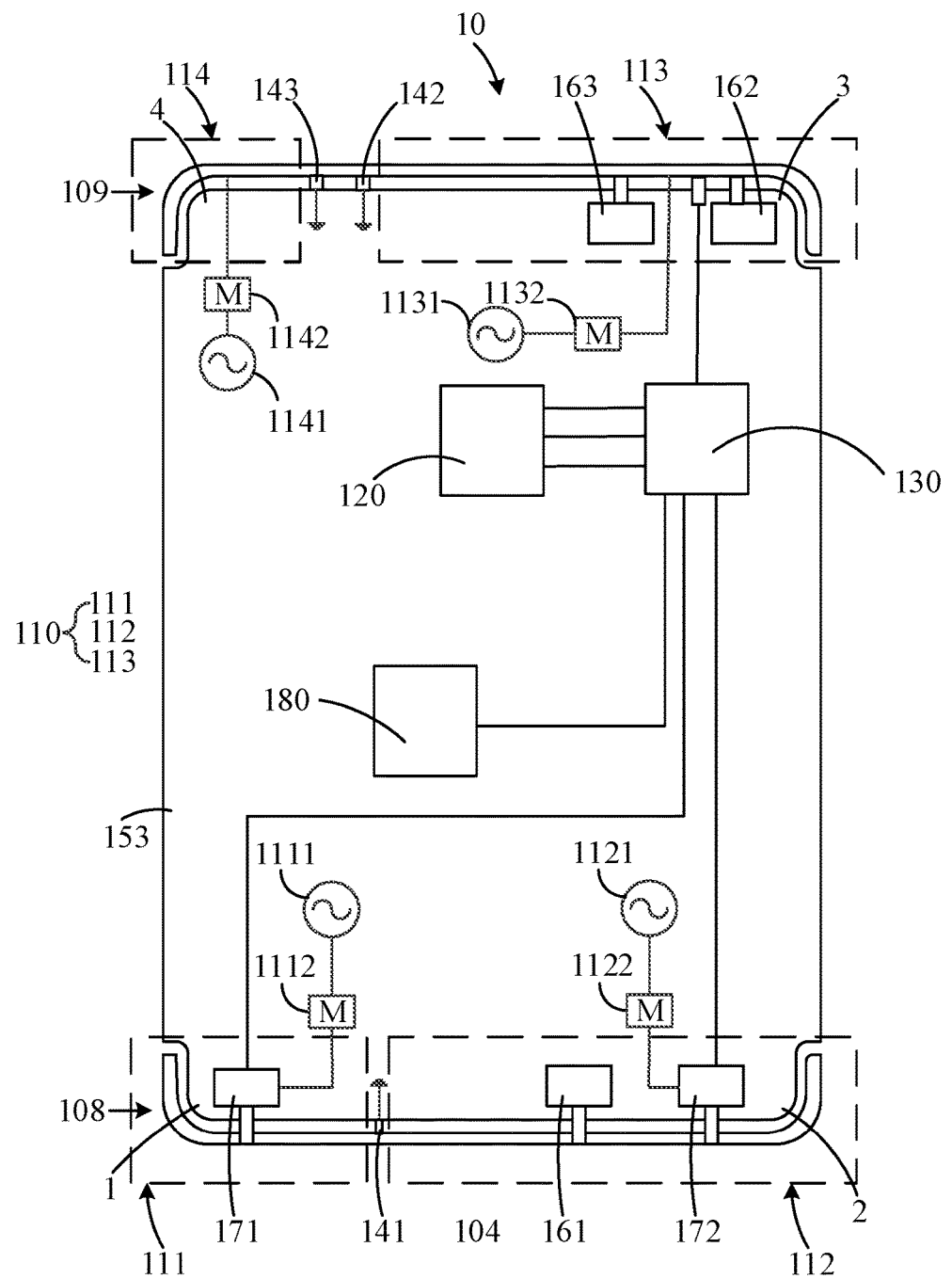
FIG. 15 illustrates the inner structure of an electronic device according to another embodiment of the present disclosure.

Referring to FIG. 15, the electronic device 10 of this embodiment further includes signal sources 1111, 1121, 1131 and 1141. Each signal source is arranged to generate wireless signals. For example, the signal source 1111 is arranged to generate high-frequency radio frequency signals, the signal source 1121 is arranged to generate middle-frequency radio frequency signals, the signal source 1131 is arranged to generate low-frequency radio frequency signals and the signal source 1141 generates Bluetooth signals, WiFi signals, GPS signals or the like.

The electronic device 100 further includes matching circuits 1112, 1122, 1132 and 1142. The matching circuit 1112 is connected with the signal source 1111. The matching circuit 1122 is connected with the signal source 1121. The matching circuit 1132 is connected with the signal source 1131. The matching circuit 1142 is connected with the signal source 1141. Each matching circuit may include electronic components such as a power amplifier, a filter and the like. Each matching circuit is arranged to perform processing such as power amplification and filtering on wireless signals generated by the connected signal source.

In some embodiments, the first antenna structure 111 is coupled to the matching circuit 1112. The second antenna structure 112 is coupled to the matching circuit 1122. The third antenna structure 113 is connected to the matching circuit 1132. The fourth antenna structure 114 is coupled to the matching circuit 1142.

The first antenna structure 111, the second antenna structure 112 and the third antenna structure 113 may be arranged to transmit and receive radio frequency signals. The fourth antenna structure 114 may be arranged to transmit and receive GPS signals, short-range communication signals and/or the like.

In some embodiments, the first antenna structure 111 is coupled to a first ground point 141, a first tuner 171, the matching circuit 1112 and the signal source 1111. The first antenna structure 111 is coupled to the first ground point 141 to be grounded. The first antenna structure 111 is coupled to the first tuner 171, the matching circuit 1112 and the signal source 1111. The first tuner 171 and the matching circuit 1112 may be regulated for frequency reconfiguration on the first antenna structure 111.

In some embodiments, the second antenna structure 112 is coupled to the first ground point 141, a second tuner 172, a first frequency modulation switch 161, the matching circuit 1122 and the signal source 1121. The second antenna structure 112 is coupled to the first ground point 141 to be grounded. It is to be noted that the second antenna structure 112 and the first antenna structure 111 share the first ground point 141. The second antenna structure 112 is coupled to the second tuner 172, the first frequency modulation switch 161, the matching circuit 1122 and the signal source 1121. The second tuner 172, the first frequency modulation switch 161 and the matching circuit 1122 may be regulated for frequency reconfiguration on the second antenna structure 112.

In some embodiments, the third antenna structure 113 is coupled to a second ground point 142, a second frequency modulation switch 162, a third frequency modulation switch 163, the matching circuit 1132 and the signal source 1131. The third antenna structure 113 is coupled to the second ground point 142 to be grounded. The third antenna structure 113 is coupled to the second frequency modulation switch 162, the third frequency modulation switch 163, the matching circuit 1132 and the signal source 1131 respectively. The second frequency modulation switch 162, the third frequency modulation switch 163 and the matching circuit 1131 may be regulated for frequency reconfiguration on the third antenna structure 113.

In some embodiments, the fourth antenna structure 114 is coupled to a third ground point 143, the matching circuit 1142 and the signal source 1141. The fourth antenna structure 114 is coupled to the third ground point 143 to be grounded. The fourth antenna structure 114 is coupled to the matching circuit 1142 and the signal source 1141 respectively. The matching circuit 1141 may be regulated for frequency reconfiguration on the fourth antenna structure 114.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. An antenna component, comprising:
  a plurality of antenna structures, wherein at least one of the plurality of antenna structures acts as a master antenna, and at least one of the plurality of antenna structures acts as a diversity antenna;
  a control switch connected with the plurality of antenna structures;
  a radio frequency module, coupled to the plurality of antenna structures through the control switch;
  wherein the control switch is arranged to, according to transmit power of the at least one of the plurality of antenna structures acting as the master antenna and receive power of the at least one of the plurality of antenna structures acting as the diversity antenna, switch the at least one of the plurality of antenna structures acting as the master antenna to a diversity antenna, and switch the at least one of the plurality of antenna structures acting as the diversity antenna to a master antenna.

2. The antenna component of claim 1, wherein
  the plurality of antenna structures comprises a first antenna structure, a second antenna structure and a third antenna structure, the first antenna structure acts as a master antenna, the second antenna structure and the third antenna structure each act as a diversity antenna;
  the control switch is arranged to, according to transmit power of the first antenna structure, receive power of the second antenna structure and receive power of the third antenna structure, switch one of the second antenna structure and the third antenna structure to a master antenna, and switch the first antenna structure to a diversity antenna.

3. The antenna component of claim 2, wherein
  when the transmit power of the first antenna structure is lower than a first threshold value, and the receive power of the one of the second antenna structure and the third antenna structure having a higher receive power is higher than a second threshold value, the control switch is arranged to switch the one of the second antenna structure and the third antenna structure having a higher receive power to a master antenna, and to switch the first antenna structure to a diversity antenna;
  the first threshold value is smaller than the second threshold value.

4. The antenna component of claim 1, wherein
  the plurality of antenna structures comprises a first antenna structure, a second antenna structure and a third antenna structure, the first antenna structure and the second antenna structure each act as a master antenna, the third antenna structure acts as a diversity antenna;
  the control switch is arranged to, according to transmit power of the first antenna structure, transmit power of the second antenna structure and receive power of the third antenna structure, switch one of the first antenna structure and the second antenna structure to a diversity antenna, and switch the third antenna structure to a master antenna.

5. The antenna component of claim 4, wherein
  when the transmit power of the one of the first antenna structure and the second antenna structure having a lower transmit power is lower than a first threshold value, and the receive power of the third antenna structure is higher than a second threshold value, the control switch is arranged to switch the one of the first antenna structure and the second antenna structure having a lower transmit power to a diversity antenna, and to switch the third antenna structure to a master antenna;
  the first threshold value is smaller than the second threshold value.

6. An electronic device, comprising an antenna component and a processor, wherein
  the antenna component comprises a first antenna structure, a second antenna structure, a third antenna structure, a radio frequency module and a control switch, the control switch is coupled to the processor;

at least one of the first antenna structure, the second antenna structure and the third antenna structure acts as a master antenna, and at least one of the first antenna structure, the second antenna structure and the third antenna structure acts as a diversity antenna;

the radio frequency module is coupled to the first antenna structure, the second antenna structure and the third antenna structure through the control switch; and the processor is arranged to:

acquire transmit power of the at least one of the first antenna structure, the second antenna structure and the third antenna structure acting as a master antenna, and acquire receive power of the at least one of the first antenna structure, the second antenna structure and the third antenna structure acting as a diversity antenna; and control the control switch to, according to the transmit power of the at least one of the first antenna structure, the second antenna structure and the third antenna structure acting as a master antenna and the receive power of the at least one of the first antenna structure, the second antenna structure and the third antenna structure acting as a diversity antenna, switch the at least one of the first antenna structure, the second antenna structure and the third antenna structure acting as a master antenna to a diversity antenna, and switch the at least one of the first antenna structure, the second antenna structure and the third antenna structure acting as a diversity antenna to a master antenna.

7. The electronic device of claim 6, wherein the first antenna structure acts as a master antenna, and the second antenna structure and the third antenna structure each act as a diversity antenna;

when the transmit power of the first antenna structure is lower than a first threshold value, and the receive power of the one of the second antenna structure and the third antenna structure having a higher receive power is higher than a second threshold value, the processor controls the control switch to switch the one of the second antenna structure and the third antenna structure having a higher receive power to a master antenna, and to switch the first antenna structure to a diversity antenna;

the first threshold value is smaller than the second threshold value.

8. The electronic device of claim 6, wherein the first antenna structure and the second antenna structure each act as a master antenna, and the third antenna structure acts as a diversity antenna;

when the transmit power of the one of the first antenna structure and the second antenna structure having a lower transmit power is lower than a first threshold value, and the receive power of the third antenna structure is higher than a second threshold value, the processor controls the control switch to switch the one of the first antenna structure and the second antenna structure having a lower transmit power to a diversity antenna, and to switch the third antenna structure to a master antenna;

the first threshold value is smaller than the second threshold value.

9. The electronic device of claim 6, further comprising a shell with a carrier, wherein the first antenna structure, the second antenna structure, the third antenna structure, the radio frequency module and the control switch are arranged on the carrier;

the carrier has four corners comprising a first corner, a second corner, a third corner and a fourth corner, and the first antenna structure, the second antenna structure and the third antenna structure are sequentially positioned at positions of the first corner, the second corner and the third corner.

10. The electronic device of claim 9, wherein the first antenna structure and the second antenna structure are positioned at a first end portion of the carrier, the third antenna structure is positioned at a second end portion of the carrier, and the first end portion and the second end portion are opposite to each other.

11. The electronic device of claim 10, wherein the antenna component further comprises a first ground point, the first ground point is positioned between the first antenna structure and the second antenna structure, and the first ground point is coupled with both the first antenna structure and the second antenna structure.

12. The electronic device of claim 10, wherein the antenna component further comprises a fourth antenna structure coupled with the radio frequency module, the fourth antenna structure is positioned at a position of the fourth corner, and the fourth antenna structure is positioned at the second end portion of the carrier.

13. The electronic device of claim 12, wherein the antenna component further comprises a second ground point and a third ground point, the third antenna structure is coupled to the second ground point, and the fourth antenna structure is coupled to the third ground point.

14. The electronic device of claim 12, wherein the fourth antenna structure is arranged to transmit and receive Global Positioning System (GPS) signals and/or short-range communication signals.

15. The electronic device of claim 1, wherein the antenna component further comprises a first tuner, the first tuner and the first ground point are mounted on the carrier, the first tuner and the first ground point are positioned at the first end portion of the carrier, and the first tuner is arranged for frequency reconfiguration on the first antenna structure.

16. The electronic device of claim 11, wherein the antenna component further comprises a second tuner and a first frequency modulation switch;

the second tuner and the first frequency modulation switch are mounted on the carrier, the second tuner and the first frequency modulation switch are positioned at the first end portion of the carrier;

the second antenna structure is coupled to the first ground point, the second tuner, the first frequency modulation switch and the control switch respectively, and both of the second tuner and the first frequency modulation switch are arranged for frequency reconfiguration on the second antenna structure.

17. The electronic device of claim 13, wherein the antenna component further comprises a second frequency modulation switch and a third frequency modulation switch;

the second ground point, the second frequency modulation switch and the third frequency modulation switch are mounted on the carrier, the third antenna structure is coupled to the second ground point, the second frequency modulation switch, the third frequency modulation switch and the control switch, and both of the second frequency modulation switch and the third frequency modulation switch are arranged for frequency reconfiguration on the third antenna structure.

18. An antenna controlling method for an electronic device, wherein
the electronic device comprises an antenna component and a processor, the antenna component comprises a plurality of antenna structures, a radio frequency module and a control switch;
at least one of the plurality of antenna structures acts as a master antenna, and at least one of the plurality of antenna structures acts as a diversity antenna;
the method comprises:
acquiring transmit power of the at least one of the plurality of antenna structures acting as a master antenna, and acquire receive power of the at least one of the plurality of antenna structures acts as a diversity antenna;
switching the at least one of the plurality of antenna structures acting as a master antenna to a diversity antenna, and switching the at least one of the plurality of antenna structures acting as a diversity antenna to a master antenna according to the transmit power of the at least one of the plurality of antenna structures acting as a master antenna and the receive power of the at least one of the plurality of antenna structures acting as a diversity antenna.

19. The antenna controlling method of claim 18, wherein the step of switching the at least one of the plurality of antenna structures acting as a master antenna to a diversity antenna, and switching the at least one of the plurality of antenna structures acting as a diversity antenna to a master antenna comprises:

when the transmit power of one of the plurality of antenna structures acting as a master antenna which has the lowest transmit power is lower than a first threshold value, and the receive power of one of the plurality of antenna structures acting as a diversity antenna which has the highest transmit power is higher than a second threshold value:
switching the one of the plurality of antenna structures acting as a master antenna which corresponds to the lowest transmit power to a diversity antenna; and
switching the one of the plurality of antenna structures acting as a diversity antenna which corresponds to the highest receive power to a master antenna;
wherein, the first threshold value is smaller than the second threshold value.

20. The antenna controlling method of claim 18, wherein
the antenna component further comprises a fourth antenna structure arranged to transmit and receive Global Positioning System (GPS) signals and/or short-range communication signals;
the method further comprises:
acquiring working state information of the radio frequency module;
acquiring receive power of the plurality of antenna structures when the working state information indicates that the radio frequency module is in an idle state; and
selecting one of the plurality of antenna structures which has the highest receive power as an opportunity diversity antenna matched with the fourth antenna structure.

* * * * *